US012698839B2

(12) United States Patent
Wong et al.

(10) Patent No.: US 12,698,839 B2
(45) Date of Patent: Aug. 4, 2026

(54) MULTI-PORT VALVE, WATER-SIDE COMPONENT, THERMAL MANAGEMENT INTEGRATED SYSTEM, AND VEHICLE

(71) Applicant: Huawei Digital Power Technologies Co., Ltd., Shenzhen (CN)

(72) Inventors: Ming Fung Wong, Dongguan (CN); Quanming Li, Dongguan (CN); Lin Du, Dongguan (CN); Linfeng Lu, Xi'an (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 94 days.

(21) Appl. No.: 18/802,239

(22) Filed: Aug. 13, 2024

(65) Prior Publication Data

US 2025/0060043 A1 Feb. 20, 2025

(30) Foreign Application Priority Data

Aug. 16, 2023 (CN) .......................... 202311036672.3

(51) Int. Cl.
    *F16K 11/085* (2006.01)
    *F16K 27/06* (2006.01)
(52) U.S. Cl.
    CPC ........ *F16K 11/0856* (2013.01); *F16K 27/065* (2013.01)
(58) Field of Classification Search
    CPC ............. B60H 1/00485; F16K 11/0853; F16K 11/0856; F16K 11/165; F16K 27/065
    See application file for complete search history.

(56) References Cited

U.S. PATENT DOCUMENTS 5,172,725 A * 12/1992 Kitagawa ............ F16K 11/0856
                                                 137/625.43
6,647,934 B2 * 11/2003 Marsh ................... F02B 39/005
                                                 60/599

(Continued)

FOREIGN PATENT DOCUMENTS

CN         112709843 A * 4/2021 ............. F16K 11/02
CN         214222094 U    9/2021

(Continued)

OTHER PUBLICATIONS

Machine English translation of CN-112709843-A (Year: 2026).*
Machine English translation of DE-3430860-C2 (Year: 2026).*

*Primary Examiner* — Hailey K. Do
(74) *Attorney, Agent, or Firm* — Conley Rose, P.C.

(57) ABSTRACT

A multi-port valve includes a valve body and a valve core, the valve core is located in an accommodation cavity of the valve body and is rotatably coupled to the valve body, and a rotation center line of the valve core is an axis line. A first interface and a second interface that couple with each other through the accommodation cavity are disposed on the valve body, and the first interface and the second interface are distributed on two opposite sides of the axis line. The valve core includes a first port, a second port, and a first channel that communicates the first port with the second port, the first channel penetrates the valve core, a part of the axis line is located in the first channel, the first port can communicate with the first interface, and the second port can communicate with the second interface.

20 Claims, 15 Drawing Sheets

(56) References Cited

U.S. PATENT DOCUMENTS

| | | | |
|---|---|---|---|
| 11,988,290 B2 * | 5/2024 | Gill | .................... F16K 11/0856 |
| 2022/0316607 A1 | 10/2022 | Surve et al. | |
| 2023/0235832 A1 | 7/2023 | Gill et al. | |

FOREIGN PATENT DOCUMENTS

| | | | |
|---|---|---|---|
| CN | 113915379 A | 1/2022 | |
| CN | 114001175 A | 2/2022 | |
| CN | 216131420 U | 3/2022 | |
| CN | 216692266 U | 6/2022 | |
| CN | 217815118 U | 11/2022 | |
| DE | 3430860 C2 * | 8/1994 | ......... F16K 11/0856 |
| DE | 102015218881 A1 | 5/2016 | |
| DE | 102021117577 A1 | 6/2022 | |
| EP | 1132339 A1 | 9/2001 | |
| WO | 2021113003 A1 | 6/2021 | |
| WO | WO-2021122949 A1 * | 6/2021 | ......... B60H 1/00278 |

* cited by examiner

132

132

132

MULTI-PORT VALVE, WATER-SIDE COMPONENT, THERMAL MANAGEMENT INTEGRATED SYSTEM, AND VEHICLE

CROSS-REFERENCE TO RELATED APPLICATION

This claims priority to Chinese Patent Application No. 202311036672.3 filed on Aug. 16, 2023, which is hereby incorporated by reference in its entirety.

TECHNICAL FIELD

This application relates to the field of thermal management technologies, and in particular, to a multi-port valve, a water-side component, a thermal management integrated system, and a vehicle.

BACKGROUND

A multi-port valve in a related technology includes a valve body and a valve core. An outer circumferential surface of the valve core is provided with several grooves, and water connection ports for communicating with the grooves are disposed on the valve body. When the valve core is rotated, and two water connection ports are correspondingly communicated with a same groove, a path may be formed through the groove and the two water connection ports, which causes a small circumferential interval between the two water connection ports. Consequently, a fluid needs to pass through a small curve when flowing in the path, and flow resistance of the fluid is large, which is not conducive to transport efficiency of the fluid.

SUMMARY

Embodiments of this application provide a multi-port valve, a water-side component, a thermal management integrated system, and a vehicle, to reduce flow resistance of the multi-port valve.

According to a first aspect, an embodiment of this application provides a multi-port valve, including a valve body and a valve core. The valve core is located in an accommodation cavity of the valve body and is rotatably connected to the valve body, a rotation center line of the valve core is an axis line, a first interface and a second interface that communicate with each other through the vacant cavity are disposed on the valve body, the first interface and the second interface are distributed on two opposite sides of the axis line, the valve core includes a first port, a second port, and a first channel that communicates the first port with the second port, the first channel penetrates the valve core, a part of the axis line is located in the first channel, the first port can communicate with the first interface, and the second port can communicate with the second interface. In this embodiment, when the valve core is rotated, the first port can communicate with the first interface, and the second port can communicate with the second interface, to form a path. The first interface and the second interface are distributed on the two opposite sides of the axis line, to increase an interval between the first interface and the second interface in an axial direction of the valve body, so as to prevent a first medium (for example, water) flowing in the valve core from flowing through a sharp curve at a small angle. Therefore, this can effectively reduce flow resistance, and improve transmission efficiency. In addition, because the first channel penetrates the valve core, and a part of the axis line is located in the first channel, a length of the first channel can be effectively reduced. This can save a limited volume of the valve core, and effectively reduce flow resistance.

In an embodiment, the first channel penetrates the valve core along a radial direction of the valve core, and the radial direction of the valve core is perpendicular to an extension direction of the axis line. Because the first channel penetrates the valve core along the radial direction of the valve core, the first channel is a straight-through channel from the first port to the second port. This can effectively reduce flow resistance of the first medium during flowing in the first channel, increase a flow velocity of the first medium, and further improve efficiency of transporting the first medium.

In some embodiments, the first channel may alternatively penetrate the valve core along a direction inclined relative to a radial direction of the valve core, and the radial direction of the valve core is perpendicular to an extension direction of the axis line. In this implementation, the first medium flows in the first channel. This can also reduce flow resistance, and improve transmission efficiency of the first medium.

In an embodiment, the first channel includes a first segment and an intermediate segment that are connected in sequence, the first port is located at an end that is of the first segment and that is far away from the intermediate segment, a part of the axis line is located in the intermediate segment, a diameter of the intermediate segment is less than a diameter of the first port, and the first segment gradually extends in a direction in which the intermediate segment faces the first port. Because the first segment gradually extends in the direction from the intermediate segment to the first port, when the first medium entering from the first port passes through the first segment, the first segment can play a guiding role, to lead the first medium into the intermediate segment. In addition, the diameter of the intermediate segment is smaller, to accelerate a flow velocity of the first medium in the intermediate segment. The diameter of the first port is large, so that the first segment can be easily connected to a water connection port of the valve body. In addition, because a size of the intermediate segment of the first channel is small, and the first segment gradually extends in the direction in which the intermediate segment faces the first port, space is reserved for opening another groove or channel at a same layer of the valve core. This optimizes a size of a channel part or a groove part at the same layer, to ensure normal liquid flowing.

In an embodiment, the first channel further includes a second segment, the first segment, the intermediate segment, and the second segment are connected in sequence, the second port is located at an end that is of the second segment and that is far away from the intermediate segment, the diameter of the intermediate segment is less than a diameter of the second port, and the second segment gradually extends in a direction in which the intermediate segment faces the second port. In this embodiment, space can also be reserved for opening another groove or channel at a same layer of the valve core. This optimizes a size of a channel part or a groove at the same layer, to ensure normal liquid flowing.

In an embodiment, the valve core includes a first core part and a second core part, the first core part and the second core part are arranged along the extension direction of the axis line, the first port, the second port, and the first channel are located in the first core part, a third port, a fourth port, and a second channel that communicates the third port with the fourth port are disposed on the second core part, the second channel penetrates the valve core, a part of the axis line is located in the second channel, a third interface and a fourth interface are disposed at positions that are of the valve body and that correspond to the second core part, the third interface and the fourth interface are distributed on the two opposite sides of the axis line, the third interface can communicate with the third port, and the fourth interface can communicate with the fourth port.

A size of the first port is greater than a size of the third port, so that in a status in which the first channel communicates the first interface with the second interface, the second core part has a first status and a second status, the second channel communicates the third interface with the fourth interface in the first status, and the second channel does not communicate the third interface with the fourth interface in the second status. Because the size of the first port is greater than the size of the third port, and a size of the second port is greater than a size of the fourth port, the valve core in this implementation can generate at least two modes. In one mode, the second core part is in the first status, the first port communicates with the first interface, the second port communicates with the second interface, the third port communicates with the third interface, and the fourth port communicates with the fourth interface. The first port communicates with the second port, and the third port communicates with the fourth port, to form two independent flow channels to be communicated with an external flow channel or component. In another mode, the second core part is in the second status, the first port communicates with the first interface, the second port communicates with the second interface, the third port does not communicate with the third interface, and the fourth port does not communicate with the fourth interface. In this case, only one flow channel is connected. In addition, there is another mode. In this mode, the first port does not communicate with the first interface, the second port does not communicate with the second interface, the third port does not communicate with the third interface, and the fourth port does not communicate with the fourth interface. The multi-port valve in this implementation has different modes, so that the multi-port valve can implement multi-way control.

In an embodiment, the valve core includes a plurality of layers of core parts, and the first core part and the second core part are core parts at two adjacent layers. Different modes may be generated through cooperation between the first core part and the second core part.

In an embodiment, the first core part and the second core part form one core structure unit, the valve core includes at least two core structure units, and the at least two core structure units are arranged in a stacked manner along the extension direction of the axis line. More use modes can be generated through cooperation between a plurality of core structures.

In an embodiment, sizes of the first interface, the second interface, the third interface, and the fourth interface each are less than or equal to the size of the third port. Therefore, the first port, the second port, the third port, and the fourth port can all be completely communicated with the first interface and the second interface. In other words, the first interface, the second interface, the third interface, and the fourth interface all can completely fall within regions corresponding to the first port, the second port, the third port, and the fourth port.

In an embodiment, the first core part is provided with a first groove, the second core part is provided with a second groove, the first groove can communicate with the first interface or the second interface, the second groove can communicate with the third interface or the fourth interface, the first groove and the second groove at least partially face each other in the extension direction of the axis line, and the valve core is provided with a first through hole configured to communicate the first groove with the second groove. The first groove cooperates with the second groove, to generate a new communication manner, so as to generate a new mode to adapt to different requirements.

In an embodiment, the first through hole extends along the extension direction of the axis line, to communicate the first groove with the second groove in the extension direction of the axis line. Because the first through hole extends along the extension direction of the axis line, the first through hole is a straight through hole. When the first medium flows from the first groove to the second groove, or flows from the second groove to the first groove, flow resistance of the first medium passing through the first through hole is reduced, to improve transmission efficiency of the first medium in the first through hole.

In an embodiment, there are two second core parts, the two second core parts are stacked and adjacent along the extension direction of the axis line, each second core part has a plurality of second grooves, and the plurality of second grooves on the two second core parts are in a one-to-one correspondence in the extension direction of the axis line. Because the plurality of second grooves on the two second core parts are in a one-to-one correspondence in the extension direction of the axis line, processing difficulty can be reduced during processing, and an overall structure of the valve core can be regular, thereby improving a force balance of the valve core.

In an embodiment, there are two second core parts, the two second core parts are provided with third grooves, the two third grooves face the first channel in the extension direction of the axis line, the valve core is provided with a second through hole, and the second through hole is configured to communicate the two third grooves with each other. The second through hole is configured to communicate the two third grooves with each other, to generate a new communication manner, so as to generate a new mode to adapt to different requirements.

In an embodiment, a proportionally adjustable port is disposed on the valve body, in a circumferential direction of the valve core, the proportionally adjustable port is adjacent to the first interface and/or the second interface, the proportionally adjustable port can communicate with the first port or the second port, and the proportionally adjustable port, and the first interface and/or the second interface can communicate with the corresponding first port and/or the corresponding second port. In this embodiment, because the proportionally adjustable port is adjacent to the first interface and/or the second interface, the proportionally adjustable port, the first interface, and the second interface can communicate with the first port or the second port, to implement proportional adjustment of flows of the first port and the second port.

In an embodiment, the valve core includes a plurality of core parts that are sequentially arranged along the extension direction of the axis line, the first port, the second port, and the first channel are disposed on one of the core parts, and at least one of the core parts can rotate relative to another core part. Because at least one of the core parts can rotate relative to another core part, the valve core in this embodiment can generate more use modes for usage in a solution that requires a plurality of paths.

According to a second aspect, an embodiment of this application provides a water-side component. The water-side component includes a water path substrate and a multi-port valve, the water path substrate includes a bottom plate, a top plate, and a connection plate that connects the bottom plate to the top plate, and the bottom plate and the top plate are disposed opposite to each other at an interval. A receptacle is enclosed with the bottom plate, the top plate, and the connection plate, the multi-port valve is disposed in the receptacle and is located between the top plate and the bottom plate, and the multi-port valve includes a plurality of water connection ports. A plurality of first external connection ports are disposed on the top plate, a plurality of second external connection ports are disposed on the bottom plate, the plurality of first external connection ports are separately communicated with some of the plurality of water connection ports, and the plurality of second external connection ports are separately communicated with some of the plurality of water connection ports. Because the multi-port valve is located in the receptacle, a flow channel of the water path substrate may be disposed around the multi-port valve, so that the flow channel of the water path substrate is three-dimensional. This can effectively use three-dimensional space, reduce a size in a direction, and facilitate miniaturization of the water-side component. In addition, the flow channel of the water path substrate is three-dimensional, to reduce design difficulty of the flow channel, and further reduce bending of the flow channel, thereby reducing flow resistance in the flow channel.

In an embodiment, a plurality of flow channels are disposed on the water path substrate, the plurality of flow channels are configured to communicate the plurality of first external connection ports with the plurality of corresponding water connection ports, and communicate the plurality of second external connection ports with the plurality of corresponding water connection ports, some of the flow channels are formed on the top plate, some of the flow channels are formed on the bottom plate, and some of the flow channels are configured to communicate the flow channel on the top plate with the flow channel on the bottom plate. Because some flow channels are located on the top plate, some flow channels are located on the bottom plate, and some flow channels are configured to communicate the flow channels on the top plate with the flow channels on the bottom plate, a three-dimensional (3D) structure of flow channels is formed. This can effectively use three-dimensional space, reduce a quantity of flow channels disposed on the bottom plate, reduce a size of the bottom plate, reduce difficulty in arranging the flow channels, and facilitate a miniaturization design of the water-side component.

In an embodiment, the some of the flow channels between the top plate and the bottom plate are arc-shaped and extend outside a periphery of the multi-port valve. Because the some of the flow channels are arc-shaped and extend outside the periphery of the multi-port valve, the flow channels can be effectively attached to the periphery of the multi-port valve, to improve design compactness of the flow channels, and facilitate the miniaturization design of the water-side component.

In an embodiment, some of the plurality of water connection ports are first interfaces, some of the plurality of water connection ports are second interfaces, the first interface is located at a position that is of the multi-port valve and that faces the top plate, and the second interface is located at a position that is of the multi-port valve and that faces the bottom plate. Because the first interface is located at the position that is of the multi-port valve and that faces the top plate, and the second interface is located at the position that is of the multi-port valve and that faces the bottom plate, the first interface is close to the first external connection port located on the top plate, and the second interface is close to the second external connection port located on the bottom plate. This can reduce a length of the flow channel communicating the first interface with the first external connection port, and reduce a length of the flow channel communicating the second interface with the second external connection port, to effectively reduce a total length of the flow channel, and further facilitate the miniaturization design of the water-side component. In addition, because the first interface and the second interface are located on two opposite sides in a first direction, some flow channels need to be located on the top plate, and some flow channels need to be located on the bottom plate, to fully utilize the three-dimensional space, so as to implement the miniaturization design.

In an embodiment, the multi-port valve includes a valve body and a valve core, the valve core is located in an accommodation cavity of the valve body and is rotatably connected to the valve body, and a rotation center line of the valve core is an axis line. The first interface and the second interface that communicate with each other through the vacant cavity are disposed on the valve body, and the first interface and the second interface are distributed on two opposite sides of the axis line. The valve core includes a first port, a second port, and a first channel that communicates the first port with the second port, the first channel penetrates the valve core, a part of the axis line is located in the first channel, the first port can communicate with the first interface, and the second port can communicate with the second interface.

In an embodiment, the connection plate includes a first plate, the first plate is located between the top plate and the bottom plate in the first direction, the first direction is a direction in which the top plate and the bottom plate are arranged, the water-side component further includes a water pump, the water pump is disposed on a side that is of the first plate and that is away from the bottom plate, and an outlet and an inlet of the water pump directly communicate with the flow channel. Because the water pump is disposed on the side that is of the first plate and that is away from the bottom plate, and the first plate is located between the top plate and the bottom plate in the first direction, the three-dimensional space can be effectively used, to effectively improve miniaturization of the water-side component.

According to a third aspect, an embodiment of this application provides a thermal management module, including a refrigerant component, a heat exchanger, and the water-side component in the first aspect. A first medium flowing in the water-side component and a second medium flowing in the refrigerant component perform heat exchange by using the heat exchanger.

According to a fourth aspect, an embodiment of this application provides a thermal management system, including a refrigerant component, a heat exchanger, the water-side component in the first aspect. A first medium flowing in the water-side component and a second medium flowing in the refrigerant component perform heat exchange by using the heat exchanger.

According to a fifth aspect, an embodiment of this application provides a thermal management system, including a water tank, a gas-liquid separator, and the thermal management integrated module in the third aspect. The thermal management integrated module is connected to the water tank and the gas-liquid separator through a coolant hose.

According to a sixth aspect, an embodiment of this application provides a vehicle, including a battery, a powertrain, and the thermal management integrated system in the fifth aspect. The thermal management integrated system is configured to perform thermal management on the battery and the powertrain.

According to a seventh aspect, this application provides an energy storage system, including an energy storage battery and the thermal management system in the fifth aspect. The thermal management system is configured to perform thermal management on the energy storage battery.

BRIEF DESCRIPTION OF DRAWINGS

To describe technical solutions in some embodiments of this application more clearly, the following briefly describes the accompanying drawings for describing some embodiments.

Figure 1A:
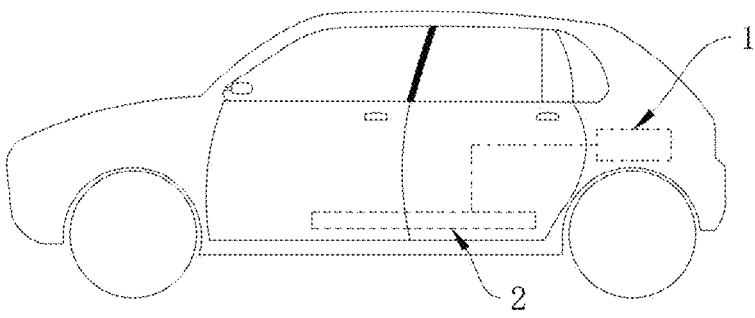
FIG. 1A is a diagram of a structure of a vehicle according to an embodiment of this application.

Reference numerals: Z: first direction; a: axis line; b: first position; c: second position; d: third position; e: fourth position; f: first angle; g: second angle; h: third angle; i:

radial section of a valve core; 1000: vehicle; 2000: energy storage system; 1: thermal management system; 11: thermal management integrated module; 12: water tank; 13: gas-liquid separator; 14: compressor; 2: thermal management object; 100: water-side component; 110: water path substrate; 1101: receptacle; 1102: flow channel; 1103: first flow channel; 1104: second flow channel; 1105: third flow channel; 111: first surface; 112: upper surface; 1121: first plane; 1122: second plane; 1123: third plane; 113: side surface; 114: bottom plate; 115: top plate; 116: connection plate; 117: first board; 120: first functional component; 121: water pump; 130: multi-port valve; 1301: water connection port; 1302: first interface; 1303: second interface; 1304: third interface; 1305: fourth interface; 131: valve body; 1311: accommodation cavity; 1312: proportionally adjustable port; 132: valve core; 1321: first port; 1322: second port; 1323: first channel; 1324: first segment; 1325: intermediate segment; 1326: second segment; 1327: first core part; 1328: first groove; 1329: second core part; 1330: second groove; 1331: first through hole; 1332: third groove; 1333: second through hole; 1334: core structure unit; 1335: third port; 1336: fourth port; 1337: second channel; 1338: first partition plate; 1339: second partition plate; 134: actuator; 140: external connection port; 141: first external connection port; 142: second external connection port; 143: water path port; 200: refrigerant component; 210: refrigerant substrate; 220: second functional component; 230: refrigerant port; 300: heat exchanger; 310: water path connection port; 320: refrigerant connection port; and 400: fastening structure.

DESCRIPTION OF EMBODIMENTS

The following first explains some terms in embodiments of this application.

In the specification, claims, and accompanying drawings of embodiments of this application, terms "first", "second", "third", "fourth", and the like are intended to distinguish between similar objects but do not necessarily indicate a specific order or sequence. It should be understood that the data termed in such a way are interchangeable in proper circumstances so that embodiments of this application described herein can be implemented in orders except the order illustrated or described herein. In addition, terms "include", "contain", and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

In this specification, terms such as "perpendicularity" and "parallelism" are explained.

Perpendicularity: Perpendicularity defined in this application is not limited to an absolute perpendicular intersection (an included angle is 90 degrees) relationship, a non-absolute perpendicular intersection relationship caused by factors such as an assembly tolerance, a design tolerance, and a structural flatness is allowed, and an error within a small angle range is allowed. For example, a relationship within an assembly angle range of 80 degrees to 100 degrees may be understood as the perpendicular relationship.

Parallelism: Parallelism defined in this application is not limited to absolute parallelism. The definition of parallelism may be understood as basic parallelism, and non-absolute parallelism caused by factors such as an assembly tolerance, a design tolerance, and a structure flatness is allowed. The factors may cause a case in which a sliding cooperation part and a first door plate are not absolutely parallel, but this application also defines, as parallelism, the case in which the sliding cooperation part and the first door plate are not absolutely parallel.

It should be noted that the accompanying drawings in the following are diagrams, and specific shapes in the accompanying drawings are not specific shapes protected in this application.

An embodiment of this application provides a thermal management system. The thermal management system in embodiments of this application is applicable to the vehicle-mounted field and the energy storage field.

For example, the thermal management system in embodiments of this application may be used in an electric vehicle in the vehicle-mounted field, and the electric vehicle is transport driven by an electric power module. The electric power module may include, for example, a power distribution unit (PDU), a microcontroller unit (MCU), mapped diagnostic context (MDC), and a motor.

For another example, the thermal management system in embodiments of this application may be used in a photovoltaic system and a wind power system in the energy storage field.

Figure 1B:
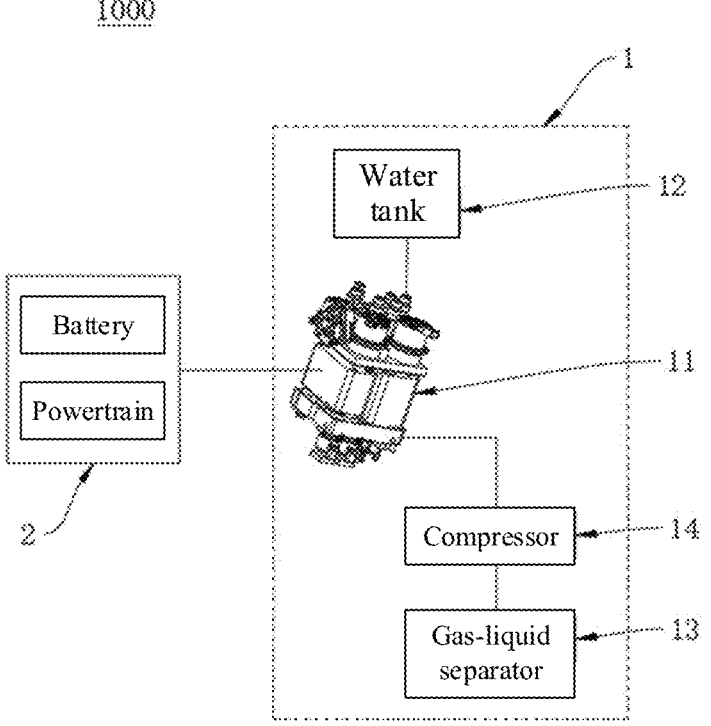
FIG. 1B is an operating block diagram of a thermal management system of a vehicle according to an embodiment of this application.

FIG. 1A is a diagram of a structure of a vehicle 1000 according to an embodiment of this application. FIG. 1B is an operating block diagram of a thermal management system 1 of the vehicle 1000 according to an embodiment of this application.

Refer to FIG. 1A and FIG. 1B. An embodiment of this application further provides the vehicle 1000. The vehicle 1000 includes the thermal management system 1 and a thermal management object 2. The thermal management system 1 is configured to perform thermal management on the thermal management object 2. It may be understood that positions of the thermal management object 2 and the thermal management system 1 in the figure are merely examples, and do not indicate that the thermal management object 2 and the thermal management system 1 need to be located in the positions shown in the figure. The thermal management object 2 and the thermal management system 1 may alternatively be disposed at other positions.

In some implementations, the thermal management object 2 includes one or more of a battery, a powertrain, and an electronic control module. For the electric vehicle, the battery is configured to provide most of electric energy required by the vehicle 1000. The powertrain is configured to provide power for the vehicle 1000, and the powertrain may include a motor, a transmission, a drive system, and an exhaust system. The electronic control module is an overall system including elements such as an electronic control unit (ECU), a harness, and a sensor that are of the vehicle, and the electronic control module may perform refined adjustment, control, and management on an automotive engine, the transmission, braking, and security control, to ensure smooth driving and stability of the vehicle in various complex driving scenarios. The electronic control module of the vehicle is an important part of the vehicle, and has high requirements on matching, debugging, maintenance, upgrading, and the like of an electronic device.

The thermal management system 1 is configured to monitor and control a temperature of the vehicle 1000, and maintain a normal operating temperature range of each part (for example, the battery, the powertrain, the electronic control module, and an interior of the vehicle) of the vehicle 1000, to improve performance, efficiency, and comfort of the vehicle 1000.

The thermal management system 1 includes a thermal management integrated module 11, a water tank 12, and a gas-liquid separator 13.

The water tank 12 is configured to provide circulated water for the thermal management integrated module 11. Because the water tank 12 is independent of the thermal management integrated module 11 and is connected to the thermal management integrated module 11 through a coolant hose, a position of the water tank 12 may be decoupled from a position of the thermal management integrated module 11. For example, the water tank 12 is placed at a higher position, and the thermal management integrated module 11 is placed at a lower position than the water tank 12. This can improve use performance of the water tank 12 and the thermal management integrated module 11, and further enable the thermal management integrated module 11 in this embodiment to be adapted to different environments, for example, the thermal management integrated module 11 may be used in the vehicle 1000 and the energy storage system. In addition, the water tank 12 and the thermal management integrated module 11 are separately and independently disposed. Therefore, the thermal management integrated module 11 is not affected by the water tank 12 with a large volume, to facilitate miniaturization of the thermal management integrated module 11.

Similarly, a component with a large volume like the gas-liquid separator 13 may also be independent of the thermal management integrated module 11, and is connected to the thermal management integrated module 11 through a coolant hose, to facilitate miniaturization of the thermal management integrated module 11.

In some implementations, a compressor 14 in the thermal management system 1 may also be disposed independently of the thermal management integrated module 11. In an example, in some implementations, the compressor 14 may alternatively be integrated into the thermal management integrated module 11.

Figure 2:
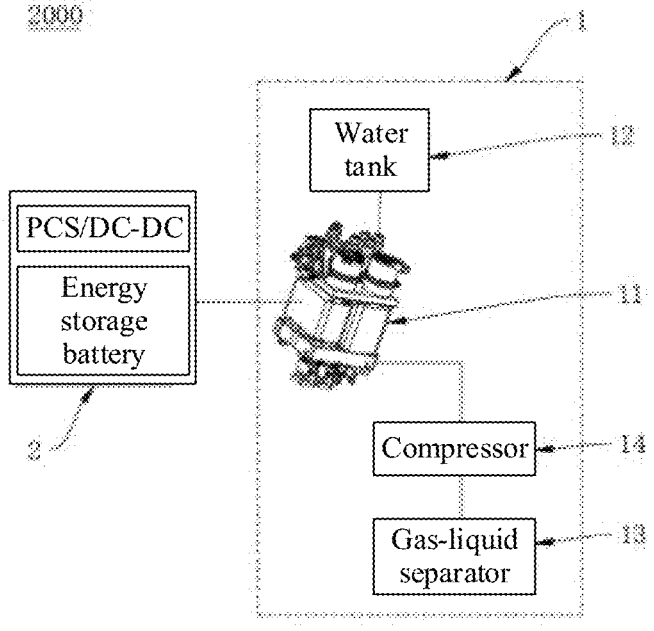
FIG. 2 is an operating block diagram of a thermal management system of an energy storage system according to an embodiment of this application.

FIG. 2 is an operating block diagram of a thermal management system 1 of an energy storage system 2000 according to an embodiment of this application.

Refer to FIG. 2. The energy storage system 2000 includes the thermal management system 1 and the thermal management object 2, and the thermal management system 1 includes a thermal management integrated module 11, a water tank 12, and a gas-liquid separator 13. For the thermal management integrated module 11, the water tank 12, and the gas-liquid separator 13, refer to the foregoing embodiment in FIG. 1B. Details are not described herein again. The thermal management object 2 in this embodiment is an energy storage battery, a power control system (PCS), a direct current-to-direct current (DC-DC) converter, and the like.

Figure 3:
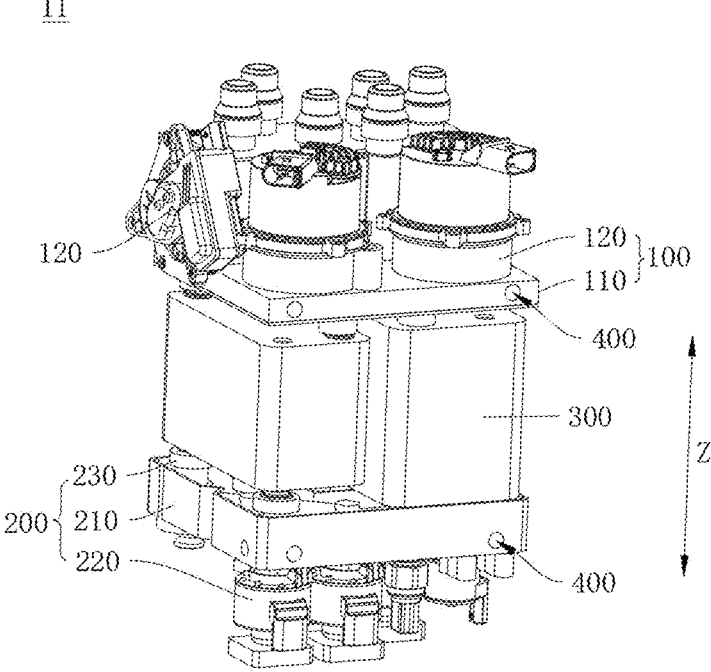
FIG. 3 is a diagram of a structure of a thermal management integrated module according to an embodiment of this application.
Figure 4:
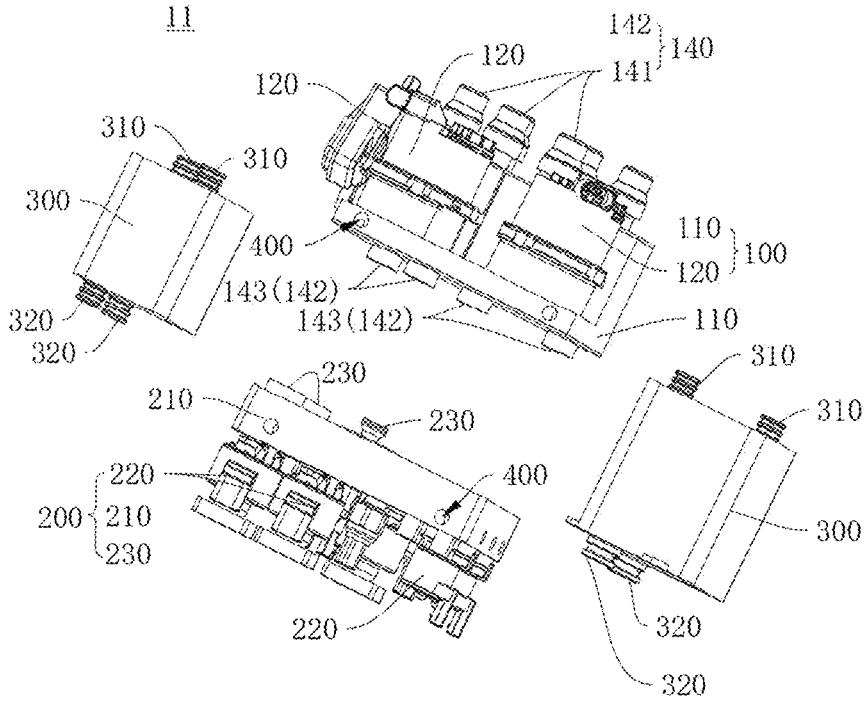
FIG. 4 is an exploded diagram of the thermal management integrated module in FIG. 3.

FIG. 3 is a diagram of a structure of the thermal management integrated module 11 according to an embodiment of this application. FIG. 4 is an exploded diagram of the thermal management integrated module 11 in FIG. 3. The thermal management integrated module 11 in this embodiment may be used in the thermal management system 1 in embodiments in FIG. 1B and FIG. 2, or may be used in another thermal management system 1, for example, a thermal management system 1 in the electronic and medical fields.

Refer to FIG. 3 and FIG. 4. The thermal management integrated module 11 includes a water-side component 100, a refrigerant component 200, and a heat exchanger 300.

The water-side component 100 in this embodiment is mainly configured to adjust and control flowing of a first medium in the system, to ensure normal operation of the device and temperature control. For example, the first medium in the water-side component 100 may flow to positions such as the battery, the powertrain, and a control unit, to implement temperature control and adjustment on the battery, the powertrain, the control unit, and the like.

The refrigerant component 200 in this embodiment is mainly configured to control a refrigerant to circulate in the system, and implement temperature adjustment through heat absorption and heat release.

A main function of the heat exchanger 300 in this embodiment is to implement heat exchange. For example, in some implementations, the heat exchanger 300 may be a condenser. In some implementations, the heat exchanger 300 may alternatively be an evaporator. In some implementations, the heat exchanger 300 may alternatively include both a condenser and an evaporator.

The water-side component 100 and the refrigerant component 200 are separately connected to the heat exchanger 300, so that heat exchange between the first medium (for example, water) flowing from the water-side component 100 to the heat exchanger 300 and a second medium (for example, a refrigerant) flowing from the refrigerant component 200 to the heat exchanger 300 is implemented by using the heat exchanger 300.

The water-side component 100 and the refrigerant component 200 are respectively located on two opposite sides of the heat exchanger 300, so that the water-side component 100, the refrigerant component 200, and the heat exchanger 300 are disposed in a "sandwich" architecture. In comparison with a solution in which a heat exchanger 300 is integrated on a side that is of a refrigerant component 200 and that is away from a water-side component 100, in this application, a size of the refrigerant component 200 can be reduced, and connection stability of functional components on the refrigerant component 200 can further be improved.

In some embodiments, the water-side component 100 includes a water path substrate 110 and several functional components located on the water path substrate 110. For case of description, the functional components in the water-side component 100 are a first functional component 120. The refrigerant component 200 includes a refrigerant substrate 210 and several functional components located on the refrigerant substrate 210. For ease of description, the functional components in the refrigerant component 200 are a second functional component 220. The heat exchanger 300 is located in gap space between the water path substrate 110 and the refrigerant substrate 210, to form a "sandwich" architecture. This can facilitate miniaturization of the refrigerant substrate 210, save a material of the refrigerant substrate 210, and improve strength of the refrigerant substrate 210.

In some implementations, the water path substrate 110 directly faces the refrigerant substrate 210 in a first direction Z. The first direction Z is also a direction in which the water-side component 100, the heat exchanger 300, and the refrigerant component 200 are sequentially arranged. In comparison with a solution in which the heat exchanger 300 is fastened on the side that is of the refrigerant substrate 210 and that is away from the water path substrate 110, in embodiments of this application, the refrigerant substrate 210 does not need to be provided with a through hole for placing the heat exchanger 300, to save a base material for manufacturing the refrigerant substrate 210, and reduce costs. In addition, because the refrigerant substrate 210 is not provided with a through hole for placing the heat exchanger 300, strength of the refrigerant substrate 210 is enhanced, and a volume of the refrigerant substrate 210 is reduced. Miniaturization of the volume of the refrigerant substrate 210 can also improve strength of the refrigerant substrate 210.

In some implementations, a water path port 143 is disposed on a side that is of the water path substrate 110 and that faces the heat exchanger 300, a water path connection port 310 is disposed on a side that is of the heat exchanger 300 and that faces the water path substrate 110, and the water path substrate 110 is connected to the water path connection port 310 of the heat exchanger 300 through the water path port 143. The water path port 143 is located on the side that is of the water path substrate 110 and that faces the heat exchanger 300, and the water path connection port 310 is located on the side that is of the heat exchanger 300 and that faces the water path substrate 110, to conveniently connect the water path substrate 110 to the water path connection port 310. In addition, a length of a coolant hose that connects the water path substrate 110 to the heat exchanger 300 may be reduced, to facilitate miniaturization of the thermal management integrated module 11.

In some implementations, the water path port 143 is directly communicated with the water path connection port 310, and the water path substrate 110 communicates with the heat exchanger 300 through the water path connection port 310 and the water path port 143, or the water path substrate 110 may be fastened to the heat exchanger 300 through the water path connection port 310 and the water path port 143.

In some implementations, the water path port 143 is communicated with the water path connection port 310 through a flexible coolant hose. Because the water path port 143 is communicated with the water path connection port 310 through the flexible coolant hose, when the water path substrate 110 deforms, hard contact does not occur on the water path port 143 and the water path connection port 310, and the water path port 143 and the water path connection port 310 are not damaged, to avoid a leakage from the water path port 143 and the water path connection port 310.

In some implementations, the water path port 143 and the water path connection port 310 may also be made of flexible materials. The water path port 143 communicates with a flow channel of the water path substrate 110, and the water path connection port 310 communicates with a flow channel of the heat exchanger 300. In an example, in some other implementations, the water path port 143 and the water path connection port 310 may also be made of rigid materials.

In some implementations, the water path port 143 and the water path substrate 110 are integrally disposed. In some implementations, the water path port 143 and the water path substrate 110 are spliced.

In some implementations, the water path connection port 310 and a housing of the heat exchanger 300 are integrated. In some implementations, the water path connection port 310 and the heat exchanger 300 are spliced.

In some implementations, the refrigerant port 230 is disposed on a side that is of the refrigerant substrate 210 and that faces the heat exchanger 300, a refrigerant connection port 320 is disposed on a side that is of the heat exchanger 300 and that faces the refrigerant substrate 210, and the refrigerant substrate 210 is connected to the refrigerant connection port 320 of the heat exchanger 300 through the refrigerant port 230. The refrigerant port 230 is located on the side that is of the refrigerant substrate 210 and that faces the heat exchanger 300, and the refrigerant connection port 320 is located on the side that is of the heat exchanger 300 and that faces the refrigerant substrate 210, to conveniently connect the refrigerant substrate 210 to the refrigerant connection port 320. In addition, a length of a coolant hose that connects the refrigerant substrate 210 to the heat exchanger 300 may be reduced, to facilitate miniaturization of the thermal management integrated module 11.

In some implementations, the refrigerant port 230 is directly communicated with the refrigerant connection port 320, and the refrigerant substrate 210 communicates with the heat exchanger 300 through the refrigerant connection port 320 and the refrigerant port 230, or the refrigerant substrate 210 may be fastened to the heat exchanger 300 through the refrigerant connection port 320 and the refrigerant port 230.

In some implementations, the refrigerant port 230 is communicated with the refrigerant connection port 320 through a flexible coolant hose. Because the refrigerant port 230 is communicated with the refrigerant connection port 320 through a flexible coolant hose, when the refrigerant substrate 210 deforms, hard contact does not occur on the refrigerant port 230 and the refrigerant connection port 320, and the refrigerant port 230 and the refrigerant connection port 320 are not damaged, to avoid a leakage from the refrigerant port 230 and the refrigerant connection port 320.

It may be understood that, in an embodiment of this application, the water-side component 100 and the heat exchanger 300 may be detachable, and may be connected through a flexible coolant hose after being detached. The water-side component 100 and the heat exchanger 300 may be connected through a flexible coolant hose after being detached. A detachable connection structure between the water-side component 100 and the heat exchanger 300 enables the thermal management integrated module 11 provided in embodiments of this application to more flexibly match different use scenarios.

In some implementations, the refrigerant port 230 and the refrigerant substrate 210 are integrally disposed. In some implementations, the refrigerant port 230 and the refrigerant substrate 210 are spliced.

In some implementations, the refrigerant connection port 320 and the housing of the heat exchanger 300 are integrated. In some implementations, the refrigerant connection port 320 and the heat exchanger 300 are spliced.

In some implementations, at least part of the heat exchanger 300 is in contact with the water path substrate 110, and at least part of the heat exchanger 300 is in contact with the refrigerant substrate 210. Because two sides that are of the heat exchanger and that are in the first direction Z are in contact with both the water path substrate 110 and the refrigerant substrate 210, it can be ensured that a distance between the water path substrate 110 and the refrigerant substrate 210 is short, and gap space between the water path substrate 110 and the refrigerant substrate 210 is only used to accommodate the heat exchanger 300. This helps implement a small size of the entire thermal management integrated module 11.

It may be understood that, in some implementations, the heat exchanger 300 is at least partially in contact with the refrigerant substrate 210, or the heat exchanger 300 is at least partially in contact with the water path substrate 110.

It may be understood that, in an embodiment of this application, the refrigerant component 200 and the heat exchanger 300 may be detachable, and may be connected through a flexible coolant hose after being detached. A detachable connection structure between the refrigerant component 200 and the heat exchanger 300 enables the thermal management integrated module 11 provided in embodiments of this application to more flexibly match different use scenarios.

In some implementations, the water path substrate 110 and/or the refrigerant substrate 210 include/includes a fastening structure 400, and the fastening structure 400 is configured to fasten the thermal management integrated module 11 in a use environment. The water path substrate 110 and/or the refrigerant substrate 210 may be fastened, by using the fastening structure 400, in a use environment that needs to be fastened, so that the thermal management integrated module 11 in embodiments is fastened in the use environment that needs to be fastened.

In some implementations, the fastening structure 400 is a fastening through hole with which the water path substrate 110 and/or the refrigerant substrate 210 are/is provided.

In some implementations, a side face of the water path substrate 110 and/or a side face of the refrigerant substrate 210 is provided with the fastening through hole, and the side face of the water path substrate 110 and/or the side face of the refrigerant substrate 210 is a face adjacent to a face facing the heat exchanger 300, so that integration of the functional component and the heat exchanger 300 is not affected.

It may be understood that, in some other implementations, the water path substrate 110 and/or the refrigerant substrate 210 may alternatively be fastened, by using the heat exchanger 300, at a position that needs to be fastened.

Figure 5:
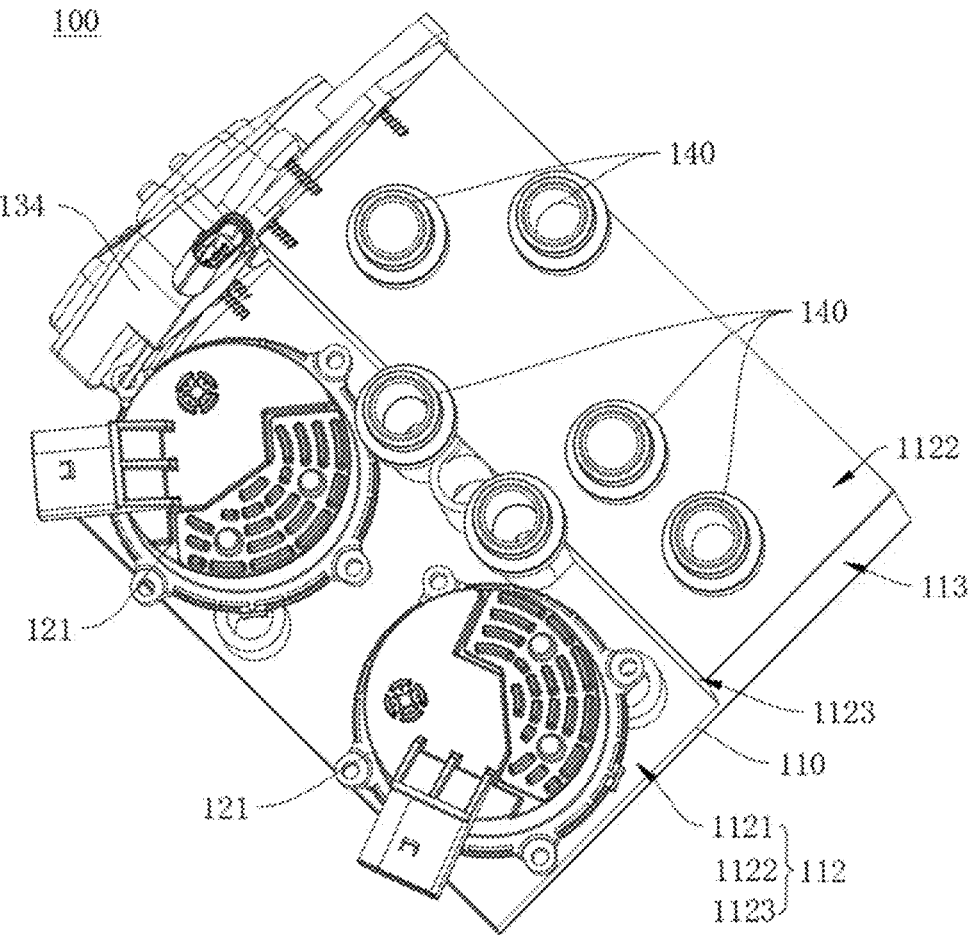
FIG. 5 is a diagram of a structure of a water-side component in the thermal management integrated module in FIG. 3.
Figure 6:
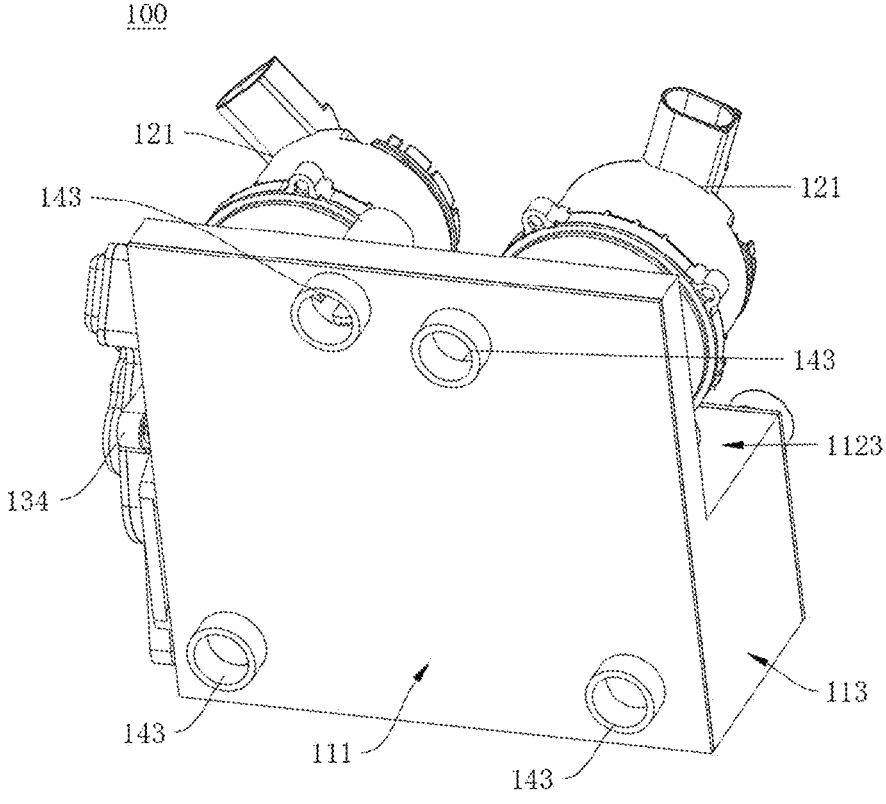
FIG. 6 is a diagram of a structure of the water-side component in FIG. 5 from another perspective.

FIG. 5 is a diagram of a structure of the water-side component 100 in the thermal management integrated module 11 in FIG. 3. FIG. 6 is a diagram of a structure of the water-side component 100 in FIG. 5 from another perspective.

Refer to FIG. 5 and FIG. 6. In some embodiments, the water path substrate 110 includes a first surface 111 facing the heat exchanger 300, and all first functional components 120 of the water-side component 100 are distributed at other positions of the water path substrate 110 except the first surface 111. The first surface 111 corresponds to the heat exchanger 300, so that a size of the first surface 111 of the water path substrate 110 matches a size of the heat exchanger 300 as much as possible. This miniaturizes the water-side component 100.

In some implementations, the first surface 111 is a plane. It may be understood that a curved surface with a small radian also belongs to the plane in this implementation. It may be understood that, in some other implementations, the first surface 111 may alternatively be a curved surface.

In some implementations, the water path substrate 110 further includes an upper surface 112 away from the heat exchanger 300 and a side surface 113 configured to connect the first surface 111 to the upper surface 112. It may be understood that, in this implementation, words such as "upper" and "side" do not limit a direction, and are similar to words such as "first" and "second" for distinguishing names.

In some implementations, the upper surface 112 is a plane, the water path substrate 110 is a sheet-shaped plate, and all first functional components 120 are disposed on the upper surface 112.

Figure 7:
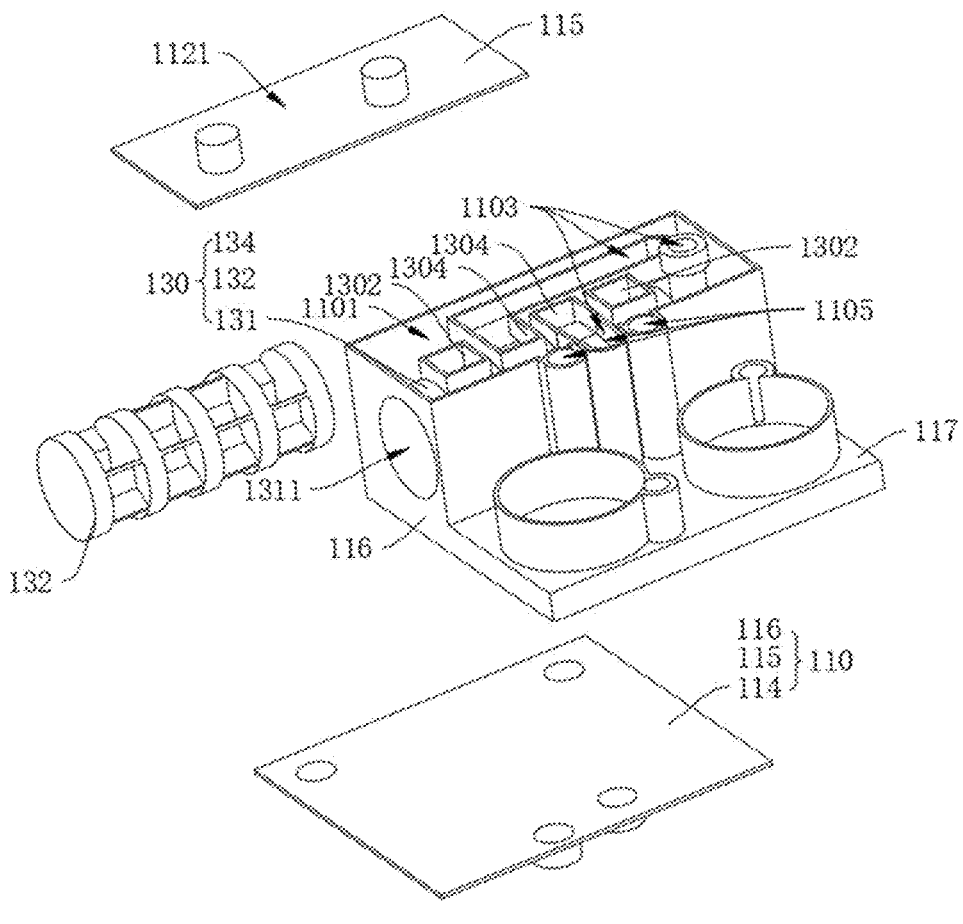
FIG. 7 is a partially exploded diagram of the water-side component in FIG. 5.

In some implementations, the upper surface 112 includes a first plane 1121, a second plane 1122, and a third plane 1123 that connects the first plane 1121 to the second plane 1122. The first plane 1121 and the second plane 1122 are parallel and do not overlap in the first direction Z, and the third plane 1123 is perpendicular to the first plane 1121. In this implementation, thickness of a part corresponding to the first plane 1121 of the water path substrate 110 is less than thickness of a part corresponding to the second plane 1122 of the water path substrate 110, and the water path substrate 110 has a receptacle 1101 (as shown in FIG. 7 below). All first functional components 120 are disposed on the upper surface 112 and/or in the receptacle 1101.

Figure 8A:
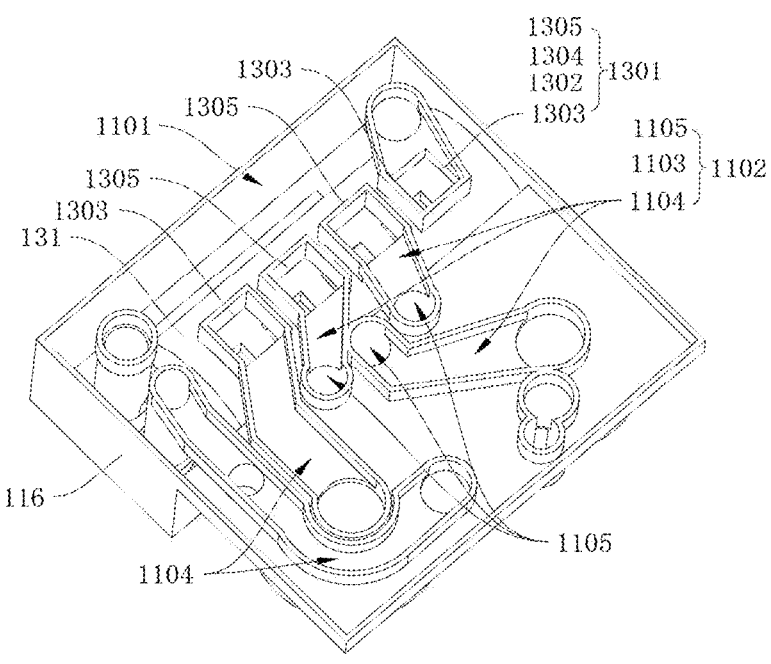
FIG. 8A is a diagram of a partial structure of the water-side component in FIG. 5.
Figure 8B:
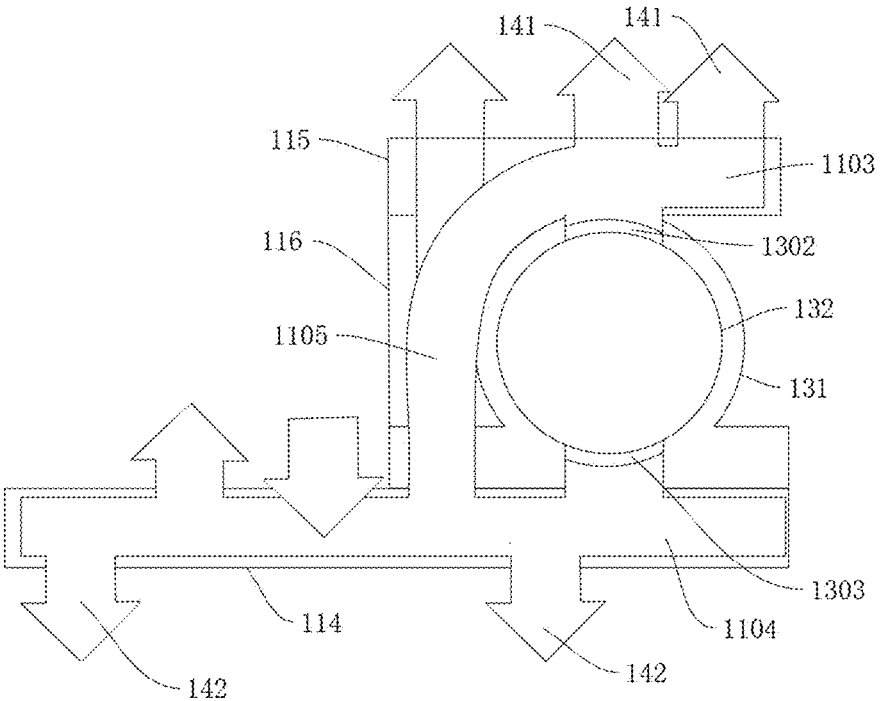
FIG. 8B is a simple diagram of the water-side component in FIG. 5.

FIG. 7 is a partially exploded diagram of the water-side component 100 in FIG. 5. FIG. 8A is a diagram of a partial structure of the water-side component 100 in FIG. 5. FIG. 8B is a simple diagram of the water-side component 100 in FIG. 5.

Refer to FIG. 5 to FIG. 7. A part of all first functional components 120 is a multi-port valve 130. The water path substrate 110 includes a bottom plate 114, a top plate 115, and a connection plate 116 that connects the bottom plate 114 to the top plate 115. The bottom plate 114 and the top plate 115 are disposed opposite to each other at an interval, a receptacle 1101 is enclosed with the bottom plate 114, the top plate 115, and the connection plate 116, and the multi-port valve 130 is disposed in the receptacle 1101 and is located between the top plate 115 and the bottom plate 114. Because the multi-port valve 130 is located in the receptacle 1101, a flow channel 1102 of the water path substrate 110 may be disposed around the multi-port valve 130, so that the flow channel 1102 of the water path substrate 110 is three-dimensional. This can effectively use three-dimensional space, reduce a size in a direction, and facilitate miniaturization of the water-side component 100. In addition, the flow channel 1102 of the water path substrate 110 is three-dimensional, to reduce design difficulty of the flow channel 1102, and further reduce bending of the flow channel 1102, thereby reducing flow resistance in the flow channel 1102.

It may be understood that the top plate 115 and the connection plate 116 may be integrally formed, or may be formed through splicing, and the connection plate 116 and the bottom plate 114 may be spliced, or may be integrally formed.

In some implementations, the top plate 115 is parallel to the bottom plate 114. In an example, in some other implementations, there may alternatively be a specific angle between the top plate 115 and the bottom plate 114.

It may be understood that, in some implementations, structures of the top plate 115 and the bottom plate 114 may be sheet-shaped. In some other implementations, the top plate 115 and the bottom plate 114 may be in other regular or irregular shapes.

It may be understood that a shape of the water path substrate 110 is not limited in this application, provided that the water path substrate 110 may form the receptacle 1101 for accommodating the multi-port valve 130.

In some implementations, the multi-port valve 130 includes a plurality of water connection ports 1301, and the plurality of water connection ports 1301 are configured to communicate with different external components to form paths.

It may be understood that the multi-port valve 130 in this application may be a three-port valve, a four-port valve, a five-port valve, a six-port valve, an eight-port valve, or another multi-port valve 130.

Further, a plurality of external connection ports 140 are disposed on the water path substrate 110. The water connection port 1301 first communicates with the external connection port 140, and then communicates with the external component through the external connection port 140. It may be understood that, when a position of the water connection port 1301 corresponds to a position of the external connection port 140, the water connection port 1301 may be directly communicated with the external connection port 140, the water connection port 1301 may be communicated with the external connection port 140 through the flow channel 1102 of the water path substrate 110, or some of the water connection ports 1301 may be directly communicated with the external connection ports 140, and some of the water connection ports 1301 may be communicated with the external connection ports 140 through the flow channels 1102 of the water path substrate 110.

In some implementations, some of the plurality of external connection ports 140 are first external connection ports 141, and some of the plurality of external connection ports 140 are second external connection ports 142. The first external connection port 141 is disposed on the top plate 115, and the second external connection port 142 is disposed on the bottom plate 114. The plurality of first external connection ports 141 separately communicate with some of the plurality of water connection ports 1301, and the plurality of second external connection ports 142 separately communicate with some of the plurality of water connection ports 1301. In this implementation, the plurality of first external connection ports 141 are located on the top plate 115, and the plurality of second external connection ports 142 are located on the bottom plate 114. In comparison with that all external connection ports 140 are disposed on the bottom plate 114, because some of the first external connection ports 141 are located on the top plate 115, a quantity of external connection ports 140 disposed on the bottom plate 114 can be effectively reduced. The multi-port valve 130 is located between the top plate 115 and the bottom plate 114, and the top plate 115 and the bottom plate 114 are in a three-dimensional architecture, to effectively reduce a size of the bottom plate 114, fully utilize three-dimensional space, and further facilitate miniaturization of the water-side component 100.

It may be understood that, in some implementations, the external connection port 140 may alternatively be disposed on the connection plate 116.

In some implementations, the plurality of second external connection ports 142 are located on a side that is of the bottom plate 114 and that faces the heat exchanger 300, that is, disposed on the first surface 111. In this implementation, the second external connection port 142 is the water path port 143, and is configured to connect to the water path connection port 310 of the heat exchanger 300.

Refer to FIG. 7, FIG. 8A, and FIG. 8B. In some embodiments, the plurality of flow channels 1102 are disposed on the water path substrate 110, the plurality of flow channels 1102 are configured to communicate the plurality of first external connection ports 141 with the plurality of corresponding water connection ports 1301, and communicate the plurality of second external connection ports 142 with the plurality of corresponding water connection ports 1301.

Some of the flow channels 1102 are formed on the top plate 115. For ease of description, the flow channel 1102 formed on the top plate 115 is a first flow channel 1103. There may be one or more first flow channels 1103, some of the first flow channels 1103 are configured to connect to the first external connection ports 141, and some of the first flow channels 1103 are configured to connect to the second external connection ports 142.

Some of the flow channels 1102 are formed on the bottom plate 114. For ease of description, the flow channel 1102 formed on the bottom plate 114 is a second flow channel 1104. There may be one or more second flow channels 1104, some of the second flow channels 1104 are configured to connect to the first external connection ports 141, and some of the second flow channels 1104 are configured to connect to the second external connection ports 142.

Some of the flow channels 1102 are configured to communicate the flow channel 1102 on the top plate 115 with the flow channel 1102 on the bottom plate 114, that is, communicating the first flow channel 1103 with the second flow channel 1104. The flow channel 1102 configured to communicate the first flow channel 1103 with the second flow channel 1104 is a third flow channel 1105, and there may be one or more third flow channels 1105.

In this implementation, because the first flow channel 1103 is located on the top plate 115, the second flow channel 1104 is located on the bottom plate 114, the third flow channel 1105 is configured to communicate the first flow channel 1103 on the top plate 115 with the second flow channel 1104 on the bottom plate 114, and the top plate 115 and the bottom plate 114 are disposed at an interval in the first direction Z, the first flow channel 1103, the second flow channel 1104, and the third flow channel 1105 form a 3D structure of the flow channels 1102. This can effectively use three-dimensional space, reduce a quantity of flow channels 1102 disposed on the bottom plate 114, reduce a size of the bottom plate 114, reduce difficulty in arranging the flow channels 1102, and facilitate a miniaturization design of the water-side component 100.

In some implementations, some of the flow channels 1102 may alternatively be formed on the connection plate 116. For example, some of the third flow channels 1105 may be disposed on the connection plate 116, to fully utilize an effective use area of the connection plate 116.

In some implementations, the some of the flow channels 1102 between the top plate 115 and the bottom plate 114 are arc-shaped and extend outside a periphery of the multi-port valve 130. Because the some of the flow channels 1102 are arc-shaped and extend outside the periphery of the multi-port valve 130, the flow channels 1102 can be effectively attached to the periphery of the multi-port valve 130, to improve design compactness of the flow channels 1102, and facilitate the miniaturization design of the water-side component 100.

In some implementations, the some of the flow channels 1102 that extend outside the periphery of the multi-port valve 130 and that are arc-shaped are the third flow channels 1105, and are configured to communicate the first flow channel 1103 with the second flow channel 1104.

Refer to FIG. 5 to FIG. 8B. Some of the plurality of water connection ports 1301 are first interfaces 1302, some of the plurality of water connection ports 1301 are second interfaces 1303, the first interface 1302 is located at a position that is of the multi-port valve 130 and that faces the top plate 115, and the second interface 1303 is located at a position that is of the multi-port valve 130 and that faces the bottom plate 114. In this implementation, because the first interface 1302 is located at the position that is of the multi-port valve 130 and that faces the top plate 115, and the second interface 1303 is located at the position that is of the multi-port valve 130 and that faces the bottom plate 114, the first interface 1302 is close to the first external connection port 141 located on the top plate 115, and the second interface 1303 is close to the second external connection port 142 located on the bottom plate 114. This can reduce a length of the flow channel communicating the first interface 1302 with the first external connection port 141, and reduce a length of the flow channel communicating the second interface 1303 with the second external connection port 142, to effectively reduce a total length of the flow channel 1102, and further facilitate the miniaturization design of the water-side component 100. In addition, because the first interface 1302 and the second interface 1303 are located on two opposite sides in the first direction Z, some flow channels 1102 need to be located on the top plate 115, and some flow channels 1102 need to be located on the bottom plate 114, to fully utilize the three-dimensional space, so as to implement the miniaturization design.

Refer to FIG. 7 and FIG. 8B. The multi-port valve 130 includes a valve body 131 and a valve core 132, the valve core 132 is located in an accommodation cavity 1311 of the valve body 131 and is rotatably connected to the valve body 131, and a rotation center line of the valve core 132 is an axis line a. The water connection port 1301 is located on the valve body 131. When the valve core 132 rotates relative to the valve body 131, the water connection port 1301 may correspond to different positions of the valve core 132, to implement conversion between different modes of the multi-port valve 130.

It may be understood that, in an embodiment, a quantity of water connection ports 1301 on the valve body 131 of the multi-port valve 130 is not limited, for example, the quantity of water connection ports 1301 may be 2, 3, 4, 5, 6, 7, 8, or 9. A position of the water connection port 1301 is not limited either. For example, in some implementations, some water connection ports 1301 face the top plate 115, and some water connection ports 1301 face the bottom plate 114. The water connection ports 1301 are designed opposite to each other in the first direction Z. In some other implementations, the water connection ports 1301 may alternatively be disposed adjacently on a periphery of the valve body 131.

In some implementations, the valve body 131 and the water path substrate 110 are integrally formed through injection molding. It may be understood that, in some implementations, the valve body 131 and the water path substrate 110 may alternatively be separately disposed.

Figure 9:
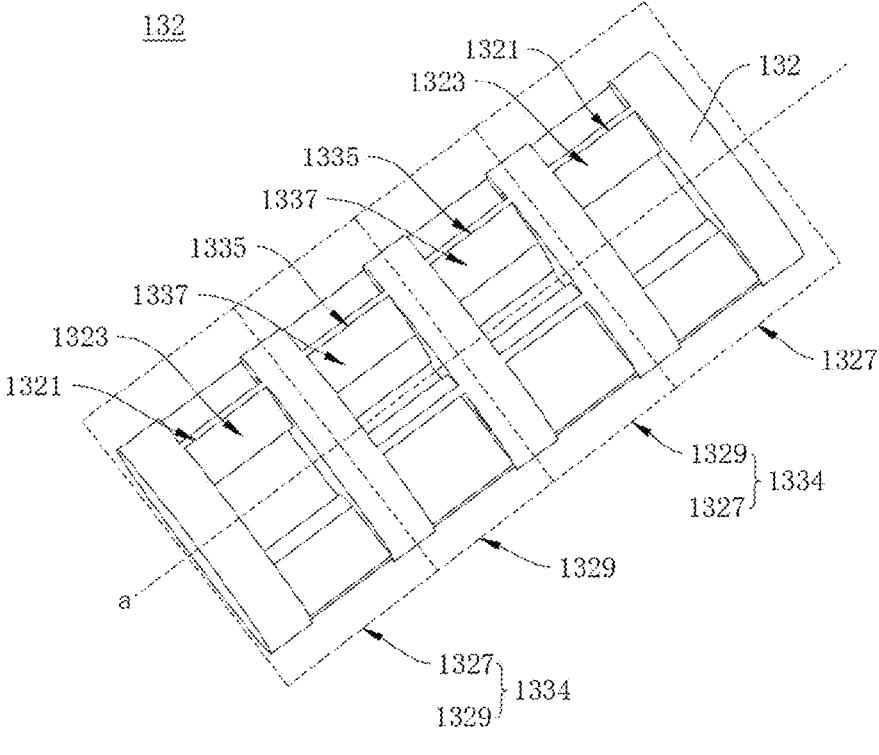
FIG. 9 is a diagram of a structure of a valve core from a perspective in the water-side component in FIG. 5.
Figure 10:
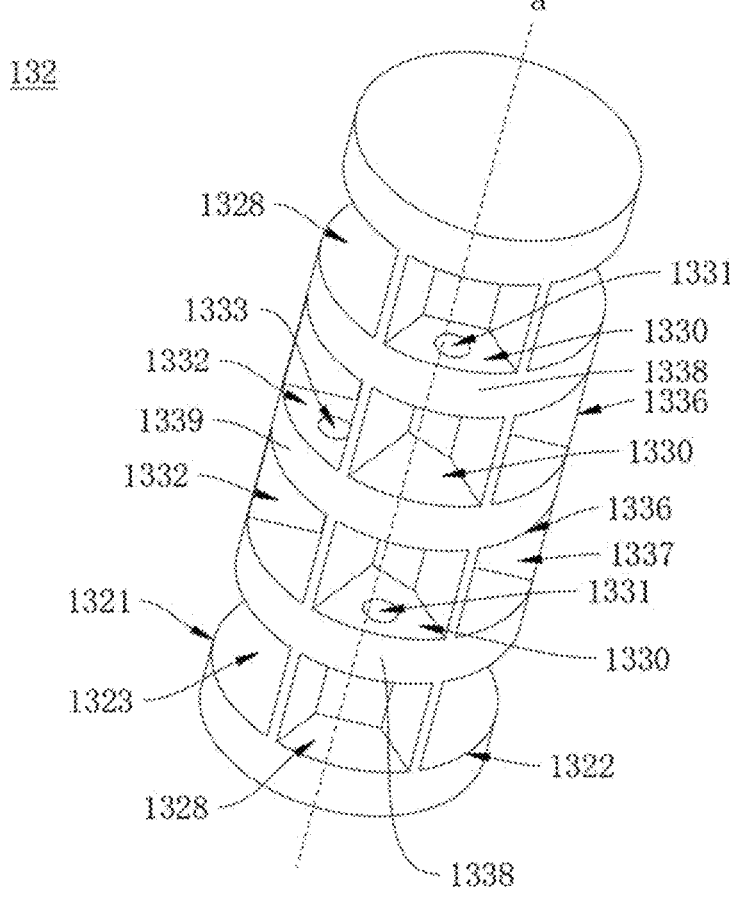
FIG. 10 is a diagram of a structure of a valve core from another perspective in the water-side component in FIG. 5.
Figure 11:
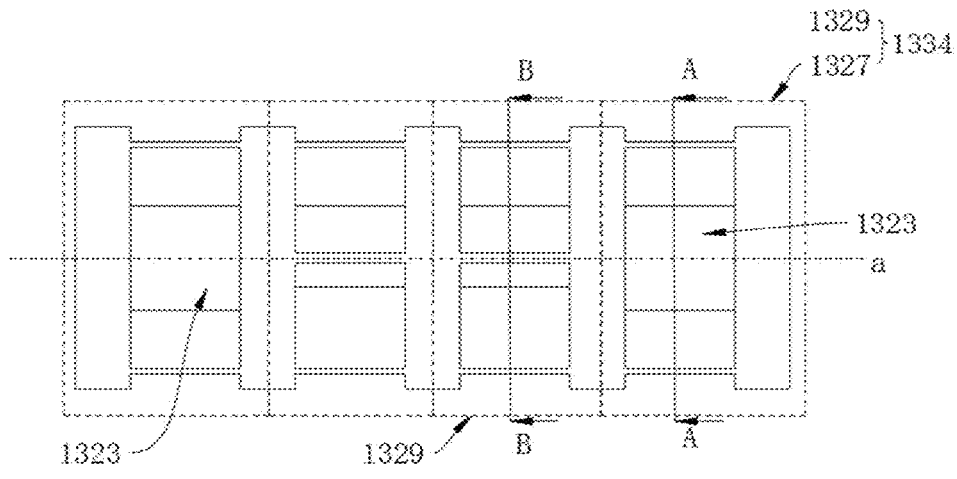
FIG. 11 is a diagram of a structure of a valve core from still another perspective in the water-side component in FIG. 5.
Figure 12:
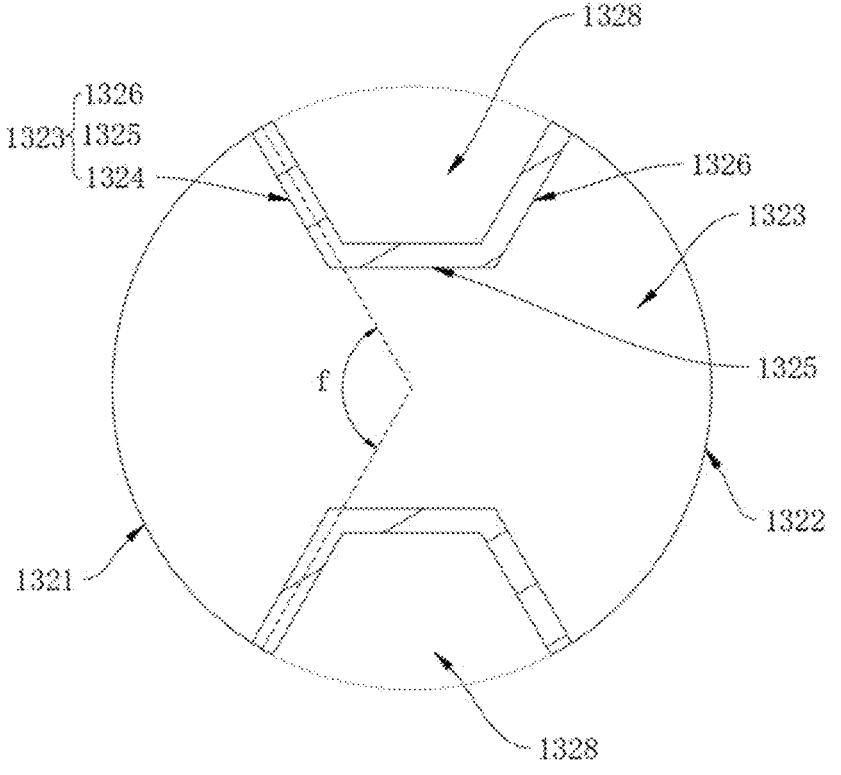
FIG. 12 is a sectional view of A-A of the valve core in FIG. 11.
Figure 13:
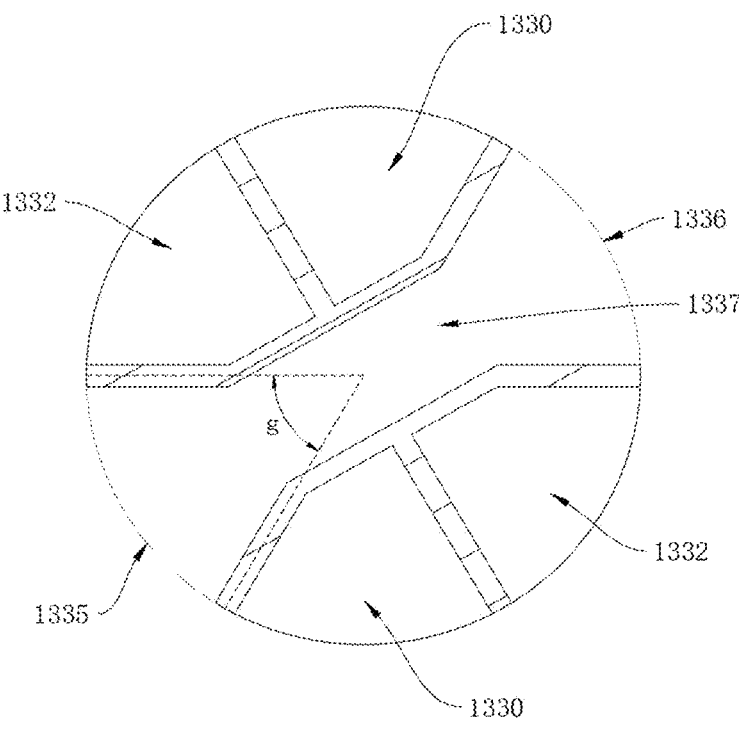
FIG. 13 is a sectional view of B-B of the valve core in FIG. 11.
Figure 14:
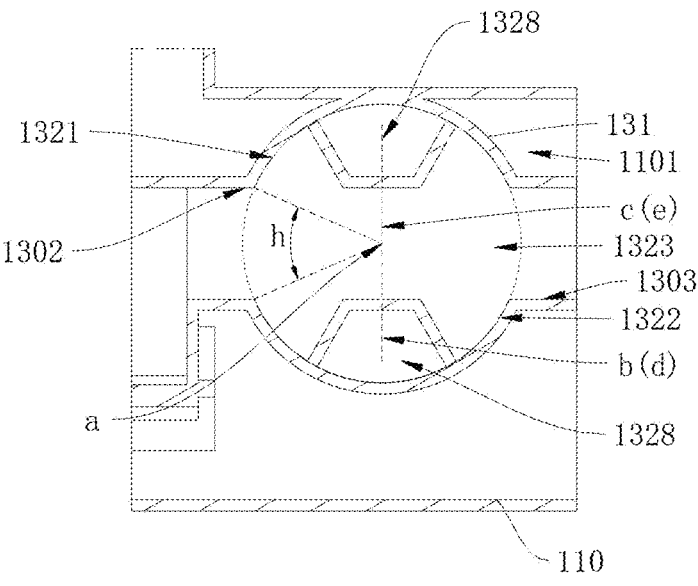
FIG. 14 is a sectional view of the partial water-side component in FIG. 8A from a perspective.

FIG. 9 is a diagram of a structure of the valve core 132 from a perspective in the water-side component 100 in FIG. 5. FIG. 10 is a diagram of a structure of the valve core 132 from another perspective in the water-side component 100 in FIG. 5. FIG. 11 is a diagram of a structure of the valve core 132 from still another perspective in the water-side component 100 in FIG. 5. FIG. 12 is a sectional view of A-A of the valve core 132 in FIG. 11. FIG. 13 is a sectional view of B-B of the valve core 132 in FIG. 11. FIG. 14 is a sectional view of the partial water-side component 100 in FIG. 8A from a perspective.

Refer to FIG. 7 to FIG. 11. The first interface 1302 and the second interface 1303 that communicate with each other through the vacant cavity are disposed on the valve body 131, the valve core 132 includes a first port 1321, a second port 1322, and a first channel 1323 that communicates the first port 1321 with the second port 1322, the first channel 1323 penetrates the valve core 132, a part of the axis line a is located in the first channel 1323, the first port 1321 can communicate with the first interface 1302, and the second port 1322 can communicate with the second interface 1303. In an embodiment, the first channel 1323 penetrates the valve core 132 to communicate the first port 1321 with the second port 1322, the first port 1321 can communicate with the first interface 1302, and the second port 1322 can communicate with the second interface 1303. Therefore, in an implementation, the first medium entering the first interface 1302 can enter the first channel 1323 through the first port 1321, flow to the second port 1322, and then flow out of the second interface 1303, to form a path. Conversion between different modes can be implemented by opening and closing the path. In an embodiment, because the first channel 1323 penetrates the valve core 132, the first channel 1323 that communicates the first port 1321 with the second port 1322 can be designed in a diversified manner, and position utilization of the valve core 132, that is, an internal region of the valve core 132, can be effectively improved. It may be understood that the internal region of the valve core 132 is relative to a peripheral region of the valve core 132. In addition, because a part of the axis line a is located in the first channel 1323, a design of the first channel 1323 does not affect a design requirement for the peripheral region of the valve core 132. When position utilization of the valve core 132 is improved and a volume of the valve core 132 is reduced, design diversity of channels in the valve core 132 can be effectively improved.

It should be noted that, because the valve core 132 may rotate relative to the valve body 131, at a specific position during rotation, the first port 1321 communicates with the first interface 1302, and the second port 1322 communicates with the second interface 1303. When the valve core 132 rotates to another position, the first port 1321 may alternatively communicate with the second interface 1303, and the second port 1322 may alternatively communicate with the first interface 1302. When the valve core 132 rotates to another position, the first port 1321 and the second port 1322 may communicate with neither the first interface 1302 nor the second interface 1303. In this case, the first port 1321 and the second port 1322 are closed.

In some implementations, the first interface 1302 and the second interface 1303 are distributed on two opposite sides of the axis line a. It should be noted that the two opposite sides of the axis line a mean two opposite sides of the valve core 132 and are not an extension direction of the axis line a. In this implementation, the first interface 1302 and the second interface 1303 are distributed on the two opposite sides of the axis line a, the first port 1321 can communicate with the first interface 1302, and the second port 1322 can communicate with the second interface 1303. Therefore, in this implementation, the flow channel 1102 of the water path substrate 110 needs to be designed as a 3D flow channel. This can improve three-dimensional space utilization of the water path substrate 110, reduce a size in a direction, and facilitate a miniaturization design of the water-side component 100.

As shown in FIG. 14, in some implementations, the first port 1321 and the second port 1322 are disposed opposite to each other along a radial direction of the valve core 132. Further, a position of the first port 1321 projected on the axis line a along the radial direction of the valve core 132 is a first position b, a position of the first interface 1302 projected on the axis line a along the radial direction of the valve core 132 is a second position c, and the first position b and the second position c at least partially overlap, so that the first port 1321 can communicate with the first interface 1302. A position of the second port 1322 projected on the axis line a along the radial direction of the valve core 132 is a third position d, a position of the second interface 1303 projected on the axis line a along the radial direction of the valve core 132 is a fourth position e, and the third position d and the fourth position e at least partially overlap, so that the second port 1322 can communicate with the second interface 1303.

Refer to FIG. 7 to FIG. 11. In some implementations, the first port 1321 directly faces the second port 1322 along the radial direction of the valve core 132. The first channel 1323 penetrates the valve core 132 along the radial direction of the valve core 132, and the radial direction of the valve core 132 is perpendicular to the extension direction of the axis line a. Because the first channel 1323 penetrates the valve core 132 along the radial direction of the valve core 132, the first channel 1323 is a straight-through channel from the first port

1321 to the second port 1322. This can effectively reduce flow resistance of the first medium during flowing in the first channel 1323, increase a flow velocity of the first medium, and further improve efficiency of transporting the first medium.

It may be understood that, in some implementations, the first channel 1323 may alternatively penetrate the valve core 132 along a direction inclined relative to the radial direction of the valve core 132, and the radial direction of the valve core 132 is perpendicular to the extension direction of the axis line a. In this implementation, the first medium flows in the first channel 1323. This can also reduce flow resistance, and improve transmission efficiency of the first medium.

In some implementations, the first channel 1323 includes a first segment 1324 and an intermediate segment 1325 that are connected in sequence, the first port 1321 is located at an end that is of the first segment 1324 and that is far away from the intermediate segment 1325, a part of the axis line a is located in the intermediate segment 1325, a diameter (for example, a size of a cross section, perpendicular to an extension direction of the intermediate segment 1325, along the extension direction of the axis line a) of the intermediate segment 1325 is less than a diameter (for example, a size of a section along a circumferential surface of the valve core 132, where the section is arc-shaped) of the first port 1321, and the first segment 1324 gradually extends in a direction in which the intermediate segment 1325 faces the first port 1321. Because the first segment 1324 gradually extends in the direction from the intermediate segment 1325 to the first port 1321, when the first medium entering from the first port 1321 passes through the first segment 1324, the first segment 1324 can play a guiding role, to lead the first medium into the intermediate segment 1325. In addition, the diameter of the intermediate segment 1325 is smaller, to accelerate a flow velocity of the first medium in the intermediate segment 1325. The diameter of the first port 1321 is large, so that the first segment can be easily connected to the water connection port 1301 of the valve body 131. In addition, because a size of the intermediate segment 1325 of the first channel 1323 is small, and the first segment 1324 gradually extends in the direction in which the intermediate segment 1325 faces the first port 1321, space is reserved for opening another groove or channel at a same layer of the valve core 132. This optimizes a size of a channel part or a groove part at the same layer, to ensure normal liquid flowing.

In some implementations, the first channel 1323 further includes a second segment 1326, the first segment 1324, the intermediate segment 1325, and the second segment 1326 are connected in sequence, the second port 1322 is located at an end that is of the second segment and that is far away from the intermediate segment 1325, the diameter of the intermediate segment 1325 is less than a diameter of the second port 1322, and the second segment 1326 gradually extends in a direction in which the intermediate segment 1325 faces the second port 1322. The second segment 1326 can also function as the first segment 1324, and details are not described herein. Because diameters of both the first segment 1324 and the second segment 1326 are larger than the diameter of the intermediate segment 1325, either the first port 1321 or the second port 1322 can play guiding and acceleration roles regardless of whether the first medium enters from the first port 1321 or the second port 1322, to improve transmission efficiency of the first medium.

In some implementations, the intermediate segment 1325 is a straight channel, to reduce flow resistance of the first medium in the intermediate segment 1325, and improve transport efficiency of the intermediate segment 1325.

In some implementations, the first segment 1324 and the second segment 1326 are sector-shaped or horn-shaped channels, and the first segment 1324 and the second segment 1326 are symmetrically disposed on two sides of the intermediate segment 1325, to improve guiding effect of the first segment 1324 and the second segment 1326 on the first medium.

In some implementations, forms of the first segment 1324 and the second segment 1326 may be the same. In an example, in some other implementations, the first segment 1324 and the second segment 1326 may be in different forms, in different sizes, in different structures, or in different sizes and shapes.

Refer to FIG. 9 to FIG. 11. In some embodiments, the valve core 132 includes a first core part 1327 and a second core part 1329, the first core part 1327 and the second core part 1329 are arranged along the extension direction of the axis line a, the first port 1321, the second port 1322, and the first channel 1323 are located in the first core part 1327, a third port 1335, a fourth port 1336, and a second channel 1337 that communicates the third port 1335 with the fourth port 1336 are disposed on the second core part 1329, the second channel 1337 penetrates the valve core 132, a part of the axis line a is located in the second channel 1337, a third interface 1304 and a fourth interface 1305 are disposed at positions that are of the valve body 131 and that correspond to the second core part 1329, the third interface 1304 and the fourth interface 1305 are distributed on two opposite sides of the axis line a, the third interface 1304 can communicate with the third port 1335, and the fourth interface 1305 can communicate with the fourth port 1336. In an embodiment, the second channel 1337 penetrates the valve core 132 to communicate the third port 1335 with the fourth port 1336, the third port 1335 can communicate with the third interface 1304, and the fourth port 1336 can communicate with the fourth interface 1305. Therefore, in an implementation, the first medium entering the third interface 1304 can enter the second channel 1337 through the third port 1335, flow to the fourth port 1336, and then flow out of the fourth interface 1305, to form a path. Conversion between different modes can be implemented by opening and closing the path. In an embodiment, because the second channel 1337 penetrates the valve core 132, the second channel 1337 that communicates the third port 1335 with the fourth port 1336 can be designed in a diversified manner, and position utilization of the valve core 132 can be effectively improved, that is, the internal region of the valve core 132 is effectively used. In addition, because a part of the axis line a is located in the second channel 1337, a design of the second channel 1337 does not affect a design requirement for the peripheral region of the valve core 132. When position utilization of the valve core 132 is improved and a volume of the valve core 132 is reduced, design diversity of channels in the valve core 132 can be effectively improved.

In some implementations, the second channel 1337 penetrates the valve core 132 along the radial direction of the valve core 132. For an example effect of the design, refer to the first channel 1323.

In some other implementations, the second channel 1337 may alternatively penetrate the valve core 132 along the direction inclined relative to the radial direction of the valve core 132. For an example effect, refer to the first channel 1323.

In some implementations, the second channel 1337 and the first channel 1323 have a similar structure: a diameter of an intermediate part is less than diameters of parts at two ends, to improve guiding effect and transmission efficiency.

For details, refer to design solutions of the intermediate segment 1325, the first segment 1324, and the second segment 1326 of the first channel 1323.

In some implementations, a size of the first port 1321 is greater than a size of the third port 1335, and a size of the second port 1322 is greater than a size of the fourth port 1336, so that in a status in which the first channel 1323 communicates the first interface 1302 with the second interface 1303, the second core part 1329 has a first status and a second status, the second channel 1337 communicates the third interface 1304 with the fourth interface 1305 in the first status, and the second channel 1337 does not communicate the third interface 1304 with the fourth interface 1305 in the second status. In this implementation, because the size of the first port 1321 is greater than the size of the third port 1335, and the size of the second port 1322 is greater than the size of the fourth port 1336, the valve core 132 in this implementation can generate at least two modes. In one mode, the second core part 1329 is in the first status, the first port 1321 communicates with the first interface 1302, the second port 1322 communicates with the second interface 1303, the third port 1335 communicates with the third interface 1304, and the fourth port 1336 communicates with the fourth interface 1305. The first port 1321 communicates with the second port 1322, and the third port 1335 communicates with the fourth port 1336, to form two independent flow channels to be communicated with an external flow channel 1102 or component. In another mode, the second core part 1329 is in the second status, the first port 1321 communicates with the first interface 1302, the second port 1322 communicates with the second interface 1303, the third port 1335 does not communicate with the third interface 1304, and the fourth port 1336 does not communicate with the fourth interface 1305. In this case, only one flow channel 1102 is connected. In addition, there is another mode. In this mode, the first port 1321 does not communicate with the first interface 1302, the second port 1322 does not communicate with the second interface 1303, the third port 1335 does not communicate with the third interface 1304, and the fourth port 1336 does not communicate with the fourth interface 1305. The multi-port valve 130 in this implementation has different modes, so that the multi-port valve 130 can implement multi-way control.

Refer to FIG. 8A to FIG. 14. In some embodiments, the first port 1321, the second port 1322, the third port 1335, and the fourth port 1336 are all arc-shaped, central angles corresponding to the first port 1321 and the second port 1322 are in a range of a first angle f, central angles corresponding to the third port 1335 and the fourth port 1336 are in a range of a second angle g, and the range of the first angle f is greater than the range of the second angle g. It should be noted that the range of the first angle f being greater than the range of the second angle g means that a minimum value in the range of the first angle f is greater than a maximum value in the range of the second angle g. Ports of the first interface 1302, the second interface 1303, the third interface 1304, and the fourth interface 1305 that face the valve core 132 are all arc-shaped and of a same size. In this implementation, a relative position relationship between the first interface 1302 and the first port 1321 changes, a relative position relationship between the second interface 1303 and the second port 1322 changes, a relative position relationship between the third interface 1304 and the third port 1335 changes, and a relative position relationship between the fourth interface 1305 and the fourth port 1336 changes. When the first core part 1327 and the second core part 1329 rotate synchronously, because the range of the first angle f is greater than the range of the second angle g, the first interface 1302 and the first port 1321 are still in a communication state when the third port 1335 corresponding to a small central angle is completely staggered from the third interface 1304, to enable the second core part 1329 to be in the second status. When the valve core 132 rotates to a specific position, the first port 1321 communicates with the first interface 1302, the second port 1322 communicates with the second interface 1303, the third port 1335 communicates with the third interface 1304, and the fourth port 1336 communicates with the fourth interface 1305. In this case, the second core part 1329 is in the first status.

In some implementations, the central angles corresponding to the first port 1321 and the second port 1322 are the first angle f, the central angles corresponding to the third port 1335 and the fourth port 1336 are the second angle g, and the first angle f is 1.5 to 2.5 times the second angle g.

In some implementations, the first angle f is 120 degrees, and the second angle g is 60 degrees. It should be noted that the first angle f being 120 degrees means that the first angle f is approximately 120 degrees, for example, may be 110 to 130 degrees. The second angle g being 60 degrees means that the second angle g is approximately 60 degrees, for example, may be 50 to 70 degrees. In this implementation, when the first status is changed to the second status, the valve core 132 may be rotated by about 60 degrees, so that the first status can be changed to the second status.

In some implementations, sizes of the first interface 1302, the second interface 1303, the third interface 1304, and the fourth interface 1305 each are less than or equal to sizes of the third port 1335 and the fourth port 1336. Therefore, the first port 1321, the second port 1322, the third port 1335, and the fourth port 1336 can be completely communicated with the first interface 1302 and the second interface 1303. In other words, the first interface 1302, the second interface 1303, the third interface 1304, and the fourth interface 1305 all can completely fall within regions corresponding to the first port 1321, the second port 1322, the third port 1335, and the fourth port 1336.

In some implementations, the first interface 1302, the second interface 1303, the third interface 1304, and the fourth interface 1305 have a same shape and size. The first interface 1302 is used as an example. A port that is of the first interface 1302 and that faces the valve core 132 is arc-shaped, a central angle corresponding to the port that is of the first interface 1302 and that faces the valve core 132 is a third angle h, and the third angle h is less than or equal to the second angle g. For example, in some implementations, the third angle h is 60 degrees. It may be understood that the third angle h being 60 degrees means that the third angle h is approximately 60 degrees, for example, may be 50 to 70 degrees.

In some implementations, the first core part 1327 is further provided with a first groove 1328. It may be understood that a quantity of first grooves 1328 may be set based on a requirement. The quantity of first grooves 1328 is not limited in this application. The first interface 1302, the second interface 1303, and the first groove 1328 are located at a same layer in the extension direction of the axis line a of the valve core 132. Therefore, when the valve core 132 rotates, the first groove 1328 can communicate with the first interface 1302. When the valve core 132 rotates to another position, the first groove 1328 may also communicate with the second interface 1303. When the valve core 132 rotates to another position, the first groove 1328 may communicate with neither the first interface 1302 nor the second interface 1303.

In some implementations, the second core part 1329 is further provided with a second groove 1330. It may be understood that a quantity of second grooves 1330 may be set based on a requirement. The quantity of second grooves 1330 is not limited in this application. The third interface 1304, the fourth interface 1305, and the second groove 1330 are located at a same layer in the extension direction of the axis line a of the valve core 132. Therefore, when the valve core 132 rotates, the second groove 1330 may communicate with the third interface 1304. When the valve core 132 rotates to another position, the second groove 1330 may also communicate with the fourth interface 1305. When the valve core 132 rotates to another position, the second groove 1330 may communicate with neither the third interface 1304 nor the fourth interface 1305.

In some implementations, the first groove 1328 and the second groove 1330 at least partially face each other in the extension direction of the axis line a, and the valve core 132 is provided with a first through hole 1331 configured to communicate the first groove 1328 with the second groove 1330. In this implementation, the first groove 1328 and the second groove 1330 at least partially face each other in the extension direction of the axis line a, and the first through hole 1331 communicates the first groove 1328 with the second groove 1330, so that the first groove 1328 of the first core part 1327 communicates with the second groove 1330 of the second core part 1329, to form one flow channel 1102. Further, the first medium may enter the first groove 1328 from the first interface 1302, enter the second groove 1330 through the first through hole 1331, and then flow out of the second groove 1330, and vice versa.

Further, in the extension direction of the axis line a, a first partition plate 1338 is disposed between the first groove 1328 and the second groove 1330, and the first partition plate 1338 is provided with the first through hole 1331. The first partition plate 1338 is disposed between the first groove 1328 and the second groove 1330, to effectively improve structure strength of the valve core 132, and increase a service life.

It may be understood that a shape of the first through hole 1331 in this implementation is not limited, for example, the first through hole 1331 may be a circular through hole, a rectangular through hole, or a through hole of another shape. A size of the first through hole 1331 in this implementation is not limited either. The size of the through hole may be adjusted during manufacturing based on a specific design requirement. For example, when the size of the first through hole 1331 is large enough, the first groove 1328 can completely communicate with the second groove 1330, and no first partition plate 1338 is disposed.

It may be understood that thickness of the first partition plate 1338 is not limited either.

In some implementations, the first through hole 1331 extends along the extension direction of the axis line a, to communicate the first groove 1328 with the second groove 1330 in the extension direction of the axis line a. In this implementation, because the first through hole 1331 extends along the extension direction of the axis line a, the first through hole 1331 is a straight through hole. When the first medium flows from the first groove 1328 to the second groove 1330, or flows from the second groove 1330 to the first groove 1328, flow resistance of the first medium passing through the first through hole 1331 is reduced, to improve transmission efficiency of the first medium in the first through hole 1331.

In some implementations, there are two second core parts 1329, the two second core parts 1329 are stacked and adjacent along the extension direction of the axis line a, each second core part 1329 has a plurality of second grooves 1330, and the plurality of second grooves 1330 on the two second core parts 1329 are in a one-to-one correspondence in the extension direction of the axis line a.

In some implementations, the two second core parts 1329 are provided with third grooves 1332, the third grooves 1332 of the two second core parts 1329 directly face the first channel 1323 in the extension direction of the axis line a, the valve core 132 is provided with a second through hole 1333, and the second through hole 1333 is configured to communicate the two third grooves 1332 with each other. In this implementation, the two third grooves 1332 directly face the first channel 1323 in the extension direction of the axis line a, and the first channel 1323 directly faces the second channel 1337 in the extension direction of the axis line a. Therefore, in the second status, the first interface 1302 communicates with the first port 1321, the second interface 1303 communicates with the second port 1322, the third interface 1304 communicates with the third groove 1332, and the fourth interface 1305 communicates with the third groove 1332. However, in the first status, the first interface 1302 communicates with the first port 1321, the second interface 1303 communicates with the second port 1322, the third interface 1304 communicates with the third port 1335, and the fourth interface 1305 communicates with the fourth port 1336.

In some implementations, the second through hole 1333 extends along the extension direction of the axis line a, to communicate the third grooves 1332 of the two second core parts 1329 with each other in the extension direction of the axis line a. In this implementation, because the second through hole 1333 extends along the extension direction of the axis line a, the second through hole 1333 is a straight through hole. When the first medium flows from the third groove 1332 of one second core part 1329 to the second groove 1330 of the other second core part 1329, flow resistance of the first medium passing through the second through hole 1333 is reduced, to improve transmission efficiency of the first medium in the second through hole 1333.

Further, in the extension direction of the axis line a, a second partition plate 1339 is disposed between adjacent third grooves 1332, and the second partition plate 1339 is provided with the second through hole 1333. The second partition plate 1339 is disposed between the third grooves 1332, to effectively improve structure strength of the valve core 132, and increase a service life.

It may be understood that a shape of the second through hole 1333 in this implementation is not limited, for example, the second through hole 1333 may be a circular through hole, a rectangular through hole, or a through hole of another shape. A size of the second through hole 1333 in this implementation is not limited either. The size of the through hole may be adjusted during manufacturing based on a specific design requirement. For example, when the size of the second through hole 1333 is large enough, the adjacent third grooves 1332 can completely communicate with each other, and no second partition plate 1339 is disposed.

It may be understood that thickness of the second partition plate 1339 is not limited either.

In some implementations, a port of the first groove 1328 and the third port 1335 are in a same size and shape.

In some implementations, a port of the second groove 1330 and the third port 1335 are in a same size and shape.

In some implementations, a port of the third groove 1332 and the third port 1335 are in a same size and shape.

It may be understood that, in some other implementations, sizes of the first groove 1328, the second groove 1330, and the third groove 1332 may be set based on an actual requirement, or may be different from a size and a shape of the third port 1335.

In some implementations, the first core part 1327 and the second core part 1329 form one core structure unit 1334, the valve core 132 includes at least two core structure units 1334, and the at least two core structure units 1334 are arranged in a stacked manner along the extension direction of the axis line a.

It may be understood that, in some other implementations, there may be a plurality of first core parts 1327, for example, may be 2, 3, 4, 5, or another quantity, and there may be a plurality of second core parts 1329, for example, may be 2, 3, 4, 5, or another quantity.

In some implementations, the valve core 132 includes a multi-layer core structure, the multi-layer core structure is distributed in a stacked manner along the extension direction of the axis line a, and the first port 1321, the first channel 1323, and the second port 1322 are distributed at one layer of the core structure.

Figure 15A:
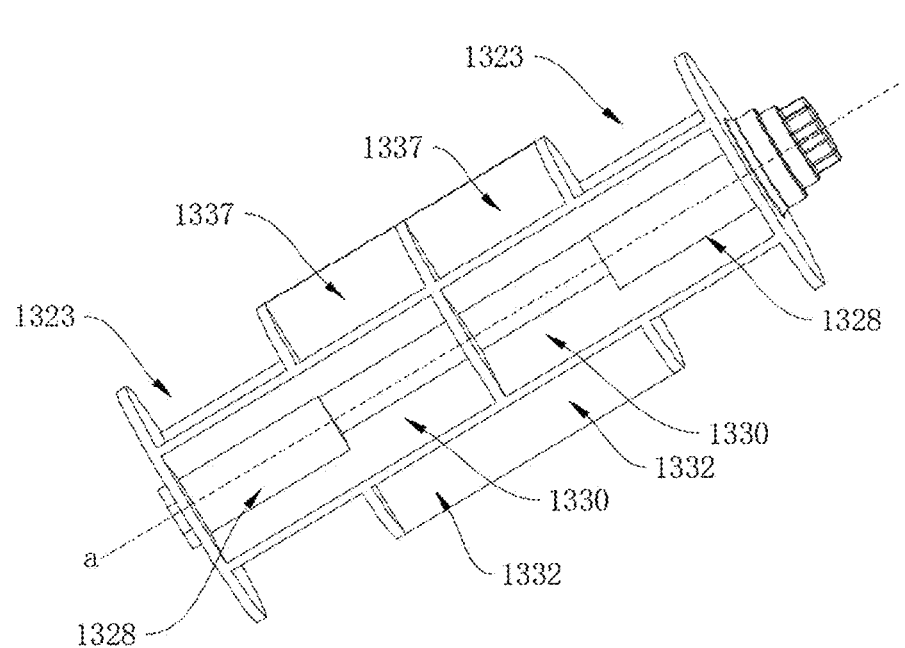
FIG. 15A is a simple diagram of a structure of a valve core according to this application.
Figure 15B:
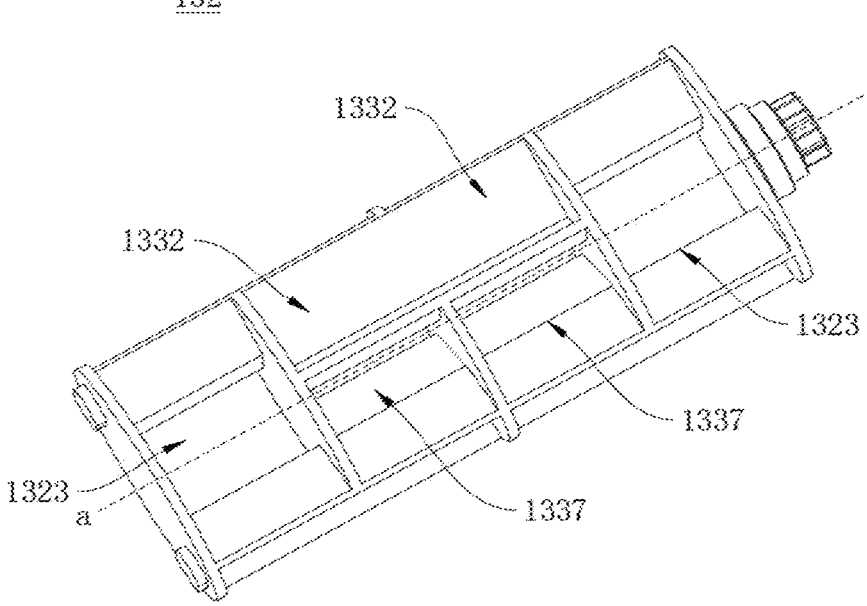
FIG. 15B is a diagram of a structure of the valve core in FIG. 15A from another perspective.

FIG. 15A is a simple diagram of a structure of another valve core 132 according to this application. FIG. 15B is a diagram of a structure of the valve core in FIG. 15A from another perspective.

Refer to FIG. 15A. In some implementations, the first partition plate 1338 in FIG. 10 is not disposed between the first groove 1328 and the second groove 1330, to directly communicate the first groove 1328 with the second groove 1330. In this case, a side wall of the first groove 1328 parallel to the extension direction of the axis line a and a side wall of the second groove 1330 parallel to the extension direction of the axis line a are located in a same plane, to effectively reduce flow resistance of the first medium when the first medium flows between the first groove 1328 and the second groove 1330, and increase a flow velocity. It should be noted that, for extension directions of the first groove 1328, the second groove 1330, the first partition plate 1338, and the axis line a that are provided in an embodiment, refer to the foregoing embodiments. Details are not described herein again.

Refer to FIG. 15B. In some implementations, in the extension direction of the axis line a, the second partition plate 1339 in FIG. 10 is not disposed between the adjacent third grooves 1332, to directly communicate the adjacent third grooves 1332 with each other. In this case, the adjacent third grooves 1332 that are parallel to the extension direction of the axis line a are located in a same plane, to effectively reduce flow resistance of the first medium when the first medium flows between the adjacent third grooves 1332, and increase a flow velocity. It should be noted that, for the third groove 1332 and the second partition plate 1339 that are increased in an embodiment, refer to the foregoing embodiments. Details are not described herein again.

FIG. 16A to FIG. 16E are simple diagrams of structures of other multi-port valves 130 according to this application.

Refer to FIG. 7 to FIG. 14 and FIG. 16A to FIG. 16E. In some embodiments, a proportionally adjustable port 1312 is disposed on the valve body 131, in a circumferential direction of the valve core 132, the proportionally adjustable port 1312 is adjacent to the first interface 1302 and/or the second interface 1303, the proportionally adjustable port 1312 can communicate with the first port 1321 or the second port 1322, and the proportionally adjustable port 1312, and the first interface 1302 and/or the second interface 1303 can communicate with the corresponding first port 1321 and/or the corresponding second port 1322. For example, in some implementations, when the valve core 132 rotates, the proportionally adjustable port 1312 rotates relative to the first port 1321, so that a size of an overlapping part between the proportionally adjustable port 1312 and the first port 1321 changes. Therefore, the proportionally adjustable port 1312 is used to adjust a proportion of the first medium that enters or flows out of the first port 1321. Similarly, when one proportionally adjustable port 1312 and one first interface 1302 can communicate with the second port 1322, the proportionally adjustable port 1312 may be used to adjust a proportion of the first medium that enters or flows out of the second port 1322. In an embodiment, because the proportionally adjustable port 1312 is adjacent to the first interface 1302 and/or the second interface 1303, the proportionally adjustable port 1312, the first interface 1302, and the second interface 1303 can communicate with the first port 1321 or the second port 1322, to implement proportional adjustment of flows of the first port 1321 and the second port 1322.

It should be noted that the proportionally adjustable port 1312 being adjacent to the first interface 1302 and/or the second interface 1303 means that on a radial section i of the valve core 132, a projection of the proportionally adjustable port 1312 is adjacent to a projection of the first interface 1302 and/or a projection of the second interface 1303 on the radial section i of the valve core 132. This is also applicable to the following embodiments. Details are not described in the following.

In some implementations, the proportionally adjustable port 1312 is adjacent to the first interface 1302. When the valve core 132 rotates to a specific position, a part of the first port 1321 directly faces the proportionally adjustable port 1312, and a part of the first port 1321 directly faces the first interface 1302. When the valve core 132 rotates to a position that completely staggers the proportionally adjustable port 1312 from the first port 1321, it is equivalent to that the proportionally adjustable port 1312 is closed.

In some implementations, the proportionally adjustable port 1312 is adjacent to the third interface 1304 and/or the fourth interface 1305, and the proportionally adjustable port 1312 can communicate with the third port 1335 or the fourth port 1336. For an example communication principle, refer to the foregoing descriptions. Details are not described herein again. For example, the proportionally adjustable port 1312 is adjacent to the third interface 1304. When the valve core 132 rotates to a specific position, a part of the third port 1335 directly faces the proportionally adjustable port 1312, and a part of the third port 1335 directly faces the third interface 1304. When the valve core 132 rotates to a position that completely staggers the proportionally adjustable port 1312 from the third port 1335, it is equivalent to that the proportionally adjustable port 1312 is closed.

A core structure is used as an example. The core structure includes one first core part 1327 and one second core part 1329. The first interface 1302, the second interface 1303, the third interface 1304, and the fourth interface 1305 are disposed on the corresponding valve body 131. The proportionally adjustable port 1312 may be disposed in at least the following plurality of manners, some of the manners are shown in FIG. 16A to FIG. 16E, and some of the manners are not shown in the accompanying drawings.

Figure 16A:
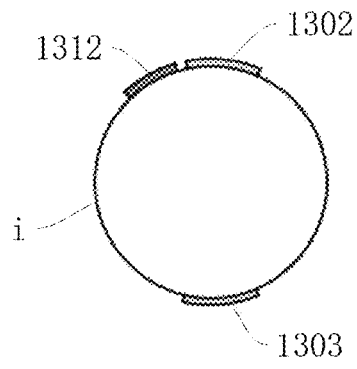
FIG. 16A, FIG. 16B, FIG. 16C, FIG. 16D, and FIG. 16E are diagrams of structures of other multi-port valves according to this application.

As shown in FIG. 16A, in a disposing manner 1, one proportionally adjustable port 1312 is disposed at a position, on the valve body 131, corresponding to the first core part 1327, and the proportionally adjustable port 1312 is adjacent to the first interface 1302.

In a disposing manner 2, one proportionally adjustable port 1312 is disposed at a position, on the valve body 131, corresponding to the first core part 1327, and the proportionally adjustable port 1312 is adjacent to the second interface 1303.

In a disposing manner 3, one proportionally adjustable port 1312 is disposed at a position, on the valve body 131, corresponding to the second core part 1329, and the proportionally adjustable port 1312 is adjacent to the third interface 1304.

In a disposing manner 4, one proportionally adjustable port 1312 is disposed at a position, on the valve body 131, corresponding to the second core part 1329, and the proportionally adjustable port 1312 is adjacent to the fourth interface 1305.

Figure 16B:
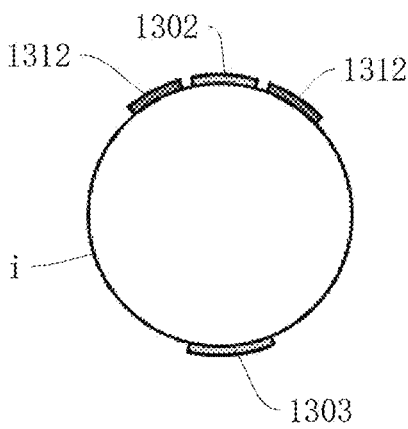

As shown in FIG. 16B, in a disposing manner 5, two proportionally adjustable ports 1312 are disposed at positions, on the valve body 131, corresponding to the first core part 1327, and the two proportionally adjustable ports 1312 are adjacent to two sides of the first interface 1302.

In a disposing manner 6, two proportionally adjustable ports 1312 are disposed at positions, on the valve body 131, corresponding to the first core part 1327, and the two proportionally adjustable ports 1312 are adjacent to two sides of the second interface 1303.

In a disposing manner 7, two proportionally adjustable ports 1312 are disposed at positions, on the valve body 131, corresponding to the second core part 1329, and the two proportionally adjustable ports 1312 are adjacent to two sides of the third interface 1304.

In a disposing manner 8, two proportionally adjustable ports 1312 are disposed at positions, on the valve body 131, corresponding to the second core part 1329, and the two proportionally adjustable ports 1312 are adjacent to two sides of the fourth interface 1305.

Figure 16C:
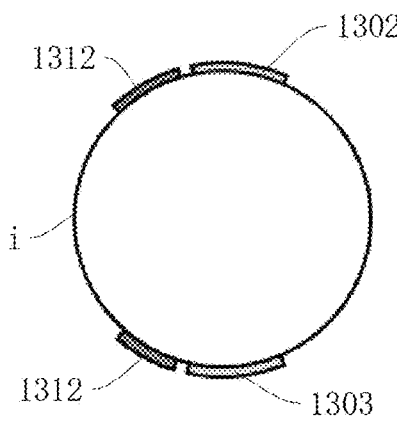

As shown in FIG. 16C, in a disposing manner 9, two proportionally adjustable ports 1312 are disposed at positions, on the valve body 131, corresponding to the first core part 1327, one proportionally adjustable port 1312 is adjacent to the first interface 1302, and one proportionally adjustable port 1312 is adjacent to the second interface 1303.

In a disposing manner 10, two proportionally adjustable ports 1312 are disposed on the valve body 131, one proportionally adjustable port 1312 is adjacent to the first interface 1302, and one proportionally adjustable port 1312 is adjacent to the third interface 1304.

In a disposing manner 11, two proportionally adjustable ports 1312 are disposed on the valve body 131, one proportionally adjustable port 1312 is adjacent to the first interface 1302, and one proportionally adjustable port 1312 is adjacent to the fourth interface 1305.

In a disposing manner 12, two proportionally adjustable ports 1312 are disposed on the valve body 131, one proportionally adjustable port 1312 is adjacent to the second interface 1303, and one proportionally adjustable port 1312 is adjacent to the third interface 1304.

In a disposing manner 13, two proportionally adjustable ports 1312 are disposed on the valve body 131, one proportionally adjustable port 1312 is adjacent to the second interface 1303, and one proportionally adjustable port 1312 is adjacent to the fourth interface 1305.

In a disposing manner 14, two proportionally adjustable ports 1312 are disposed at positions, on the valve body 131, corresponding to the second core part 1329, one proportionally adjustable port 1312 is adjacent to the third interface 1304, and one proportionally adjustable port 1312 is adjacent to the fourth interface 1305.

In a disposing manner 15, three proportionally adjustable ports 1312 are disposed on the valve body 131, one proportionally adjustable port 1312 is adjacent to the first interface 1302, one proportionally adjustable port 1312 is adjacent to the second interface 1303, and one proportionally adjustable port 1312 is adjacent to the third interface 1304.

In a disposing manner 16, three proportionally adjustable ports 1312 are disposed on the valve body 131, one proportionally adjustable port 1312 is adjacent to the first interface 1302, one proportionally adjustable port 1312 is adjacent to the second interface 1303, and one proportionally adjustable port 1312 is adjacent to the fourth interface 1305.

In a disposing manner 17, three proportionally adjustable ports 1312 are disposed on the valve body 131, one proportionally adjustable port 1312 is adjacent to the second interface 1303, one proportionally adjustable port 1312 is adjacent to the third interface 1304, and one proportionally adjustable port 1312 is adjacent to the fourth interface 1305.

Figure 16D:
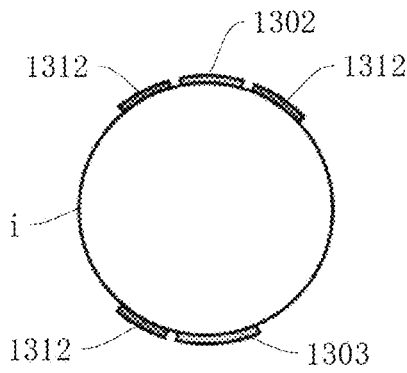

As shown in FIG. 16D, in a disposing manner 18, three proportionally adjustable ports 1312 are disposed on the valve body 131, two proportionally adjustable ports 1312 are adjacent to the first interface 1302, and one proportionally adjustable port 1312 is adjacent to the second interface 1303.

In a disposing manner 19, four proportionally adjustable ports 1312 are disposed on the valve body 131, one proportionally adjustable port 1312 is adjacent to the first interface 1302, one proportionally adjustable port 1312 is adjacent to the second interface 1303, one proportionally adjustable port 1312 is adjacent to the third interface 1304, and one proportionally adjustable port 1312 is adjacent to the fourth interface 1305.

Figure 16E:
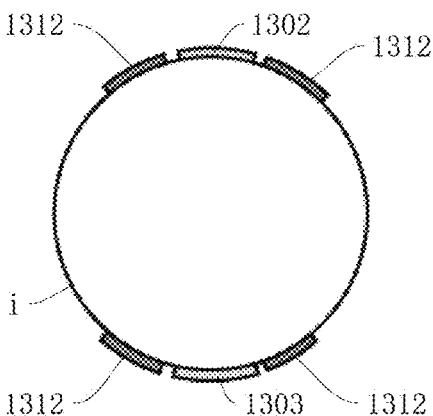

As shown in FIG. 16E, in a disposing manner 20, four proportionally adjustable ports 1312 are disposed on the valve body 131, two proportionally adjustable ports 1312 are adjacent to the first interface 1302, and two proportionally adjustable ports 1312 are adjacent to the second interface 1303.

It may be understood that, in some other implementations, two or more proportionally adjustable ports 1312 may alternatively be disposed adjacent to one first interface 1302.

Refer to FIG. 5 and FIG. 6. The multi-port valve 130 further includes an actuator 134, and the actuator 134 is configured to drive the valve core 132 to rotate relative to the valve body 131.

Refer to FIG. 5 to FIG. 11. In some implementations, the valve core 132 includes a plurality of core parts that are sequentially arranged along the extension direction of the axis line a, and the first port 1321, the second port 1322, and the first channel 1323 are disposed on one of the core parts.

In some implementations, a plurality of core parts are integrally formed. The plurality of core parts may be driven by using one actuator 134.

In some implementations, at least one core part can rotate relative to another core part. In this implementation, at least two actuators 134 are required to separately drive the core parts to rotate.

Refer to FIG. 5 to FIG. 8B. The connection plate 116 includes a first board 117. In the first direction Z, the first board 117 is located between the top plate 115 and the bottom plate 114.

In some implementations, some of all first functional components 120 are water pumps 121, and some of the remaining first functional components 120 are multi-port valves 130. It may be understood that, in some other implementations, the first functional component 120 may further include another component, for example, may further integrate with a temperature sensor, a water level switch, the water tank 12, a controller of the water pump 121, a valve of the water pump 121, a pulser, or an overflow valve.

In some implementations, the water pump 121 is distributed on the first plane 1121, and at least a part of the multi-port valve 130 is disposed at a position that is in the receptacle 1101 and that corresponds to the second plane 1122. Because at least a part of the multi-port valve 130 is located inside the water path substrate 110, the flow channel 1102 of the water path substrate 110 may be designed in a 3D architecture. This can effectively use three-dimensional space, reduce a size that is of the water path substrate 110 and that is in a direction perpendicular to the first direction Z, and facilitate miniaturization of the water-side component 100.

Further, the first surface 111 is a surface that is of the bottom plate 114 and that faces the heat exchanger 300, and the second plane 1122 is a surface that is of the top plate 115 and that is away from the heat exchanger 300. It may be understood that in some other implementations, the surface that is of the top plate 115 and that is away from the heat exchanger 300 may be not a plane, but may be a curved surface.

Figure 17:
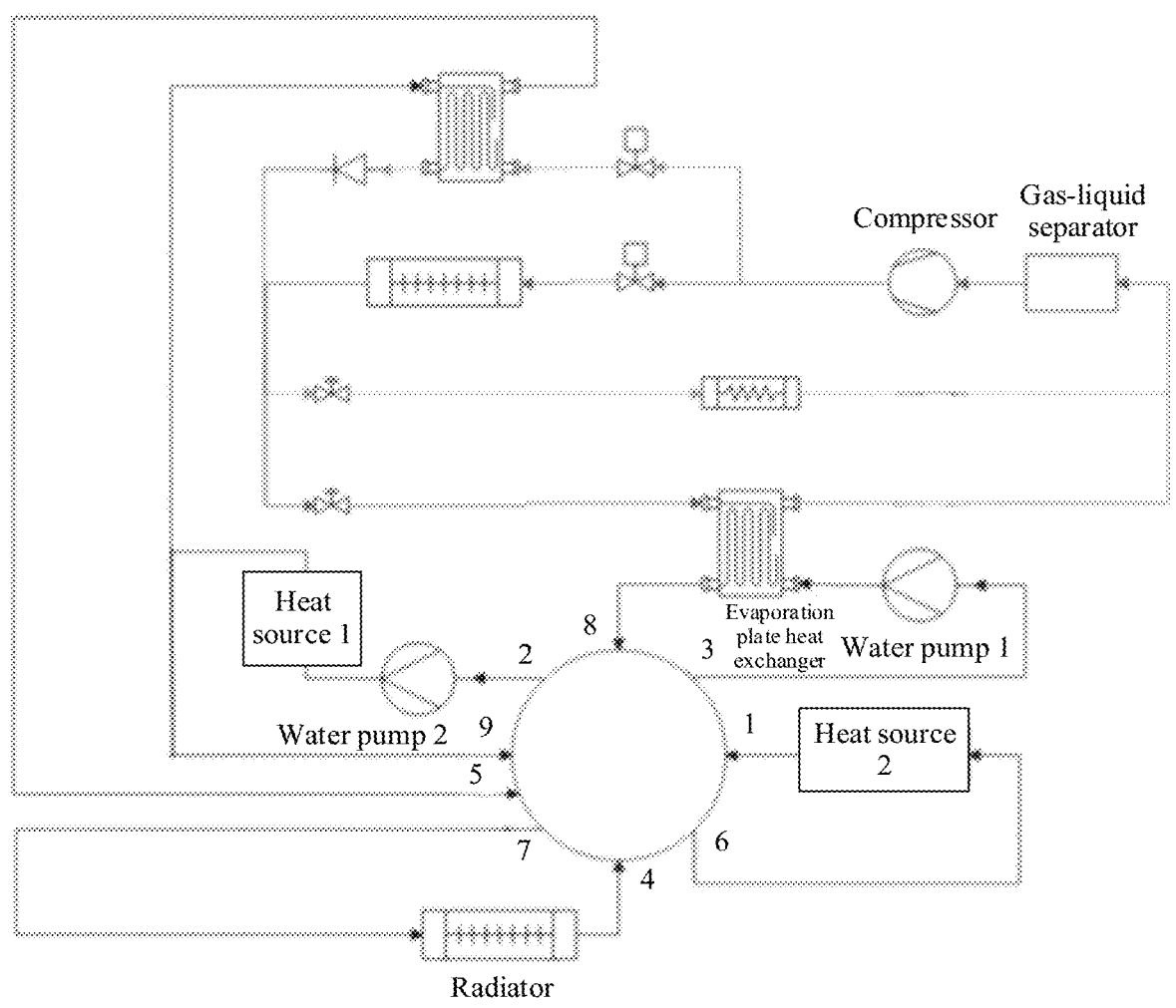
FIG. 17 is a diagram of a working principle of a thermal management system according to an embodiment of this application.
Figure 18:
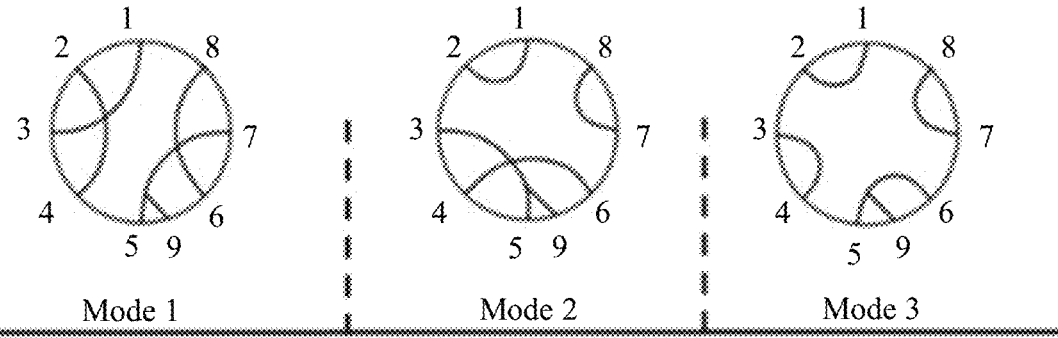
FIG. 18 shows a connection status of each water connection port when a multi-port valve is in three different modes.

FIG. 17 is a diagram of a working principle of the thermal management system 1 according to an embodiment of this application. FIG. 18 shows a connection status of each water connection port 1301 when the multi-port valve 130 is in three different modes.

Refer to FIG. 7 to FIG. 18. In some example implementations, the valve core 132 includes two core structure units 1334. The two core structure units 1334 are symmetrically disposed, that is, two second core parts 1329 are disposed in a stacked manner along the extension direction of the axis line a, and two first core parts 1327 are respectively located on two opposite sides of the two second core parts 1329 in the extension direction of the axis line a.

The two first core parts 1327 have a same structure. The first core part 1327 is provided with two first grooves 1328, a first port 1321 and a second port 1322 that are opposite to each other along the valve core 132 in a radial direction, and a first channel 1323 that communicates the first port 1321 with the second port 1322. The two second core parts 1329 have a same structure. The second core part 1329 is provided with two second grooves 1330, two third grooves 1332, a third port 1335 and a fourth port 1336 that are opposite to each other along the valve core 132 in a radial direction, and a second channel 1337 that communicates the third port 1335 with the fourth port 1336. The first groove 1328, the second groove 1330, the third groove 1332, the third port 1335, and the fourth port 1336 all correspond to a same central angle, and the central angles corresponding to the first port 1321 and the second port 1322 are twice the central angle corresponding to the third port 1335.

In an example implementation, the central angles corresponding to the first groove 1328, the second groove 1330, the third groove 1332, the third port 1335, and the fourth port 1336 are all 60 degrees, and central angles corresponding to the first port 1321 and the second port 1322 are 120 degrees. Along the extension direction of the axis line a, the first groove 1328 and second groove 1330 that are adjacent are opposite to each other and communicate with each other through the first through hole 1331, two adjacent third grooves 1332 are opposite to each other and communicate with each other through the second through hole 1333, a part of the first channel 1323 directly faces the adjacent second channel 1337, and a part of the first channel 1323 directly faces the adjacent third groove 1332.

Nine water connection ports 1301 are disposed on the valve body 131. Two water connection ports 1301 are first inlets 1302, two water connection ports 1301 are second inlets 1303, two water connection ports 1301 are third interfaces 1304, two water connection ports 1301 are fourth interfaces 1305, and one water connection port 1301 is a proportionally adjustable port 1312. A pair of a first interface 1302 and a second interface 1303 that directly face each other in the radial direction of the valve body 131 are disposed at positions that are of the valve body 131 and that correspond to each of the two first core parts 1327 and each of the two second core parts 1329, and the proportionally adjustable port 1312 is located at one layer of the core parts.

In some embodiments, the thermal management system 1 includes an evaporator, an evaporation plate heat exchanger, a condenser, a condensation plate heat exchanger, the compressor 14, the gas-liquid separator 13, a check valve, an expansion valve, a solenoid valve, the multi-port valve 130, the water pump 121, and a radiator. In an embodiment, the thermal management object 2 adjusted by the thermal management system 1 is a heat source 1 and a heat source 2. For example, the heat source 1 is a powertrain, and the heat source 2 is a battery.

The multi-port valve 130 is an eight-port valve, and nine water connection ports 1301 of the valve body 131 are respectively an interface 1, an interface 2, an interface 3, an interface 4, an interface 6, an interface 7, an interface 8, an interface 5, and an interface 9. The interface 9 is a proportionally adjustable port 1312. Two ends of the evaporation plate heat exchanger are separately connected to the interface 3 and the interface 8, and the first medium flowing out of the interface 3 flows into the interface 8 through the water pump 1 and the evaporation plate heat exchanger. Two ends of the heat source 2 are separately connected to the interface 1 and the interface 6, and the first medium flowing out of the interface 6 flows into the interface 1 through the heat source 2. Two ends of the radiator are separately connected to the interface 7 and the interface 4, and the first medium flowing out of the interface 7 flows into the interface 4 through the radiator. One end of the heat source 1 is connected to the interface 2, and the other end of the heat source 1 is separately connected to the interface 9 and the interface 5. After passing through the water pump 2 and the heat source 1, the first medium that flows out of the interface 2 may directly flow into the interface 9, or may flow into the interface 5 through the condensation plate heat exchanger.

Refer to FIG. 18. In some implementations, the multi-port valve 130 has three modes. In a mode 1, the interface 1 communicates with the interface 3, the interface 2 communicates with the interface 4, the interface 9 communicates with the interface 7, the interface 5 communicates with the interface 7, and the interface 6 communicates with the interface 8. In a mode 2, the interface 1 communicates with the interface 2, the interface 3 communicates with the interface 9, the interface 3 communicates with the interface 5, the interface 4 communicates with the interface 6, and the interface 7 communicates with the interface 8. In a mode 3, the interface 1 communicates with the interface 2, the interface 3 communicates with the interface 4, the interface 9 communicates with the interface 6, the interface 5 communicates with the interface 6, and the interface 7 communicates with the interface 8. The actuator 134 drives the valve core 132 to rotate relative to the valve body 131, to implement conversion between the three modes.

It can be learned from the foregoing that, in the mode 1, a first flow channel may be formed: interface 3→interface 8→interface 6→interface 1→interface 3. Because the first medium flowing out of the interface 3 flows into the interface 8 through the water pump 1 and the evaporation plate heat exchanger, and the evaporation plate heat exchanger performs evaporation for cooling, the first medium in the first flow channel may have a low temperature, to cool the heat source 2. When the heat source 2 is a battery, a powertrain, an electronic control module, or the like, the thermal management system 1 in the mode 1 may be used for heat dissipation of the battery, the powertrain, and the electronic control module in summer. When cold air generated by the evaporation plate heat exchanger blows to the interior vehicle, it can also cool the interior vehicle.

In addition, in the mode 1, a second flow channel may further be formed: interface 7→interface 4→interface 2→interface 9 (5)→interface 7. In this case, heat dissipation may be performed on the heat source 1 by using the radiator. When the interface 5 is completely closed, the first medium heated by the condensation plate heat exchanger connected to the interface 5 does not flow to the interface 7. In this case, heat dissipation may be performed on the heat source 1 by using the radiator, to cool the heat source 1. Different heat sources may be set as the heat source 1 based on a requirement. For example, the heat source 1 may alternatively be a battery, a powertrain, or an electronic control module. In this case, the second flow channel may also be used for cooling in summer. When the interface 5 is opened, more widely the interface 5 is opened, more first media that are heated by the condensation plate heat exchanger flow to the second flow channel, and heating effect is better. In this case, the heat source 1 may be heated.

It may be understood that the first flow channel and the second flow channel may be opened and closed independently. In summer, both the first flow channel and the second flow channel may be opened, and the interface 9 is completely closed, to dissipate heat from the heat source 1 and the heat source 2. In winter, the first flow channel may be closed, the second flow channel may be opened, and the interface 9 may be opened. The heat source 1 is heated by using the condenser, for example, the battery is heated in winter.

In the mode 2, a third flow channel may be formed: interface 2→interface 9 (5)→interface 3→interface 8→interface 7→interface 4→interface 6→interface 1→interface 2. When the interface 5 is completely closed, the thermal management system 1 in the mode 2 may be used in summer. The first medium cooled by the evaporation plate heat exchanger may flow to the third flow channel passing through the heat source 1, the heat source 2, and the radiator respectively, to perform heat dissipation on the heat source 1 and the heat source 2 for cooling. When the interface 5 is opened and the evaporation plate heat exchanger stops working, the thermal management system 1 in the mode 2 may be used in winter. The first medium that is heated by the condensation plate heat exchanger may flow to the third flow channel passing through the heat source 1, the heat source 2, and the radiator respectively, to heat the heat source 1 and the heat source 2 and adjust temperatures of the heat source 1 and the heat source 2.

In the mode 3, a fourth flow channel may be formed: interface 2→interface 9 (5)→interface 6→interface 1→interface 2. When the interface 5 is opened, the first medium that is heated by the condenser may flow to the fourth flow channel, to heat the heat source 1 and the heat source 2. In this case, the thermal management system 1 in the mode 3 may be used in winter. When the interface 5 is closed, heat balance of the heat source 1 and heat balance of the heat source 2 may be implemented.

In addition, in the mode 3, a fifth flow channel may further be formed: interface 3→interface 8→interface 7→interface 4→interface 3. For example, in winter, the interior vehicle may be heat up through the fifth flow channel.

The foregoing descriptions are example implementations of this application, and are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A multi-port valve comprising:

a valve body comprising an accommodation cavity;

a valve core located in the accommodation cavity, rotatably coupled to the valve body, and comprising:

a rotation center line that is an axis line;

core parts that are sequentially arranged along an extension direction of the axis line;

a first port;

a second port; and a first channel coupling the first port with the second port, penetrating the valve core, and comprising a first part of the axis line, wherein the first port, the second port, and the first channel are disposed on one of the core parts, and wherein at least one of the core parts is configured to rotate relative to another core part;

a first interface disposed on the valve body and coupled to the first port; and a second interface disposed on the valve body and coupled to the first interface through the accommodation cavity and further coupled to the second port, wherein the first interface and the second interface are distributed on two opposite sides of the axis line.

2. The multi-port valve of claim 1, wherein the first channel penetrates the valve core along a radial direction of the valve core, and wherein the radial direction is perpendicular to the extension direction of the axis line.

3. The multi-port valve of claim 1, wherein the first channel further comprises:

a first segment comprising a first end, wherein the first port is located at the first end, and wherein the first segment extends in a direction; and an intermediate segment coupled in sequence with the first segment, wherein the first end is located away from the intermediate segment, wherein the first part is located in the intermediate segment, wherein a first diameter of the intermediate segment is less than a second diameter of the first port, and wherein the intermediate segment faces the first port in the direction.

4. The multi-port valve of claim 1, further comprising a proportionally adjustable port disposed on the valve body in a circumferential direction of the valve core, wherein the proportionally adjustable port is adjacent to the first interface or the second interface and couples with the first port or the second port and coupled with the proportionally adjustable port, and wherein the first interface or the second interface couples with a corresponding first port or a corresponding second port.

5. The multi-port valve of claim 1, wherein the valve core further comprises:

a first core part arranged along the extension direction of the axis line, wherein the first port, the second port, and the first channel are located in the first core part; and a second core part arranged along the extension direction and comprising:

a third port;

a fourth port; and a second channel coupling the third port with the fourth port, penetrating the valve core, and comprising a second part of the axis line, wherein the multi-port valve further comprises:

a third interface coupled to the third port; and a fourth interface coupled to the fourth port, wherein the third interface and the fourth interface are disposed at positions that are of the valve body and that correspond to the second core part, wherein the third interface and the fourth interface are distributed on the two opposite sides, wherein a first size of the first port is greater than a second size of the third port, and wherein when the first channel couples the first interface with the second interface, the second core part has:

a first status that the second channel couples the third interface with the fourth interface; and a second status that the second channel does not couple the third interface with the fourth interface.

6. The multi-port valve of claim 5, wherein the valve core further comprises:

layers of core parts, wherein the first core part and the second core part are at two adjacent layers of the layers, wherein the core parts that are adjacent to each other form one core structure unit; and at least two core structure units arranged in a stacked manner along the extension direction.

7. The multi-port valve of claim 5, wherein each of a third size of the first interface, a fourth size of the second interface, a fifth size of the third interface, and a sixth size of the fourth interface is less than or equal to the second size.

8. The multi-port valve of claim 5, wherein the first core part is provided with a first groove to couple the first interface or the second interface, wherein the second core part is provided with a second groove to couple the third interface or the fourth interface, wherein the first groove and the second groove partially face each other in the extension direction, and wherein the valve core is provided with a first through hole configured to couple the first groove with the second groove.

9. The multi-port valve of claim 8, wherein the first through hole extends along the extension direction to couple the first groove with the second groove in the extension direction.

10. The multi-port valve of claim 8, wherein the valve core further comprises two second core parts stacked and adjacent along the extension direction.

11. The multi-port valve of claim 8, wherein the valve core further comprises:

two second core parts provided with third grooves, wherein two third grooves of the third grooves face the first channel in the extension direction; and a second through hole configured to couple the two third grooves with each other.

12. A water-side component comprising:

a water path substrate comprising:

a bottom plate;

a top plate disposed opposite to the bottom plate at an interval;

a connection plate coupling the bottom plate to the top plate; and a receptacle enclosed with the bottom plate, the top plate, and the connection plate; and a multi-port valve disposed in the receptacle, located between the top plate and the bottom plate, and comprising:

a valve body comprising an accommodation cavity;

a valve core located in the accommodation cavity, rotatably coupled to the valve body, and comprising:

a rotation center line that is an axis line;

a first port;

a second port; and a first channel coupling the first port with the second port, penetrating the valve core, and comprising a first part of the axis line;

a first interface disposed on the valve body and coupled to the first port;

a second interface disposed on the valve body and coupled to the first interface through the accommodation cavity and further coupled to the second port, wherein the first interface and the second interface are distributed on two opposite sides of the axis line;

water connection ports;

first external connection ports disposed on the top plate and separately coupled with a first portion of the water connection ports; and second external connection ports disposed on the bottom plate and separately coupled with a second portion of the water connection ports.

13. The water-side component of claim 12, wherein a third portion of the water connection ports are first interfaces, wherein a fourth portion of the water connection ports are second interfaces, wherein each of the first interfaces is located at a first position that is of the multi-port valve and that faces the top plate, and wherein each of the second interfaces is located at a second position that is of the multi-port valve and that faces the bottom plate.

14. The water-side component of claim 12, further comprising flow channels disposed on the water path substrate and configured to:

couple the first external connection ports with the first portion of the water connection ports; and couple the second external connection ports with the second portion of the water connection ports, wherein a third portion of the flow channels are formed on the top plate, wherein a fourth portion of the flow channels are formed on the bottom plate, and wherein a fifth portion of the flow channels are configured to couple the third portion of the flow channels with the fourth portion of the flow channels.

15. The water-side component of claim 14, wherein a sixth portion of the flow channels between the top plate and the bottom plate are arc-shaped and extend outside a periphery of the multi-port valve.

16. The water-side component of claim 12, wherein the connection plate comprises a first plate located between the top plate and the bottom plate in a first direction, and wherein the top plate and the bottom plate are arranged in the first direction.

17. The water-side component of claim 16, wherein the first plate comprises a side located away from the bottom plate, and wherein the water-side component further comprises:

a flow channel; and a water pump disposed on the side and comprising an outlet and an inlet directly coupled to the flow channel.

18. A thermal management system comprising:

a refrigerant component configured to allow a flow of a second medium;

a water-side component configured to allow a flow of a first medium and comprising:

a water path substrate comprising:

a bottom plate;

a top plate disposed opposite to the bottom plate at an interval;

a connection plate coupling the bottom plate to the top plate; and a receptacle enclosed with the bottom plate, the top plate, and the connection plate; and a multi-port valve disposed in the receptacle, located between the top plate and the bottom plate, and comprising:

a valve body comprising an accommodation cavity;

a valve core located in the accommodation cavity, rotatably coupled to the valve body, and comprising:

a rotation center line that is an axis line;

a first port;

a second port; and a first channel coupling the first port with the second port, penetrating the valve core, and comprising a first part of the axis line;

a first interface disposed on the valve body and coupled to the first port; and a second interface disposed on the valve body and coupled to the first interface through the accommodation cavity and further coupled to the second port, wherein the first interface and the second interface are distributed on two opposite sides of the axis line;

water connection ports;

first external connection ports disposed on the top plate and separately coupled with a first portion of the water connection ports; and second external connection ports disposed on the bottom plate and separately coupled with a second portion of the water connection ports; and a heat exchanger coupled to the refrigerant component and the water-side component and configured to perform heat exchange using the first medium and the second medium.

19. The thermal management system of claim 18, wherein the connection plate comprises a first plate located between the top plate and the bottom plate in a first direction, and wherein the top plate and the bottom plate are arranged in the first direction.

20. The thermal management system of claim 19, wherein the first plate comprises a side located away from the bottom plate, and wherein the water-side component further comprises:

a flow channel; and a water pump disposed on the side and comprising an outlet and an inlet directly coupled to the flow channel.

* * * * *